US012287678B2

(12) United States Patent
Lee et al.

(10) Patent No.: US 12,287,678 B2
(45) Date of Patent: Apr. 29, 2025

(54) ELECTRONIC DEVICE WITH DISPLAY PROTECTION STRUCTURE

(71) Applicant: SAMSUNG ELECTRONICS CO., LTD., Suwon-si (KR)

(72) Inventors: Geuna Lee, Suwon-si (KR); Sangyoup Seok, Suwon-si (KR); Minsu Jung, Suwon-si (KR); Byounguk Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 216 days.

(21) Appl. No.: 18/123,700

(22) Filed: Mar. 20, 2023

(65) Prior Publication Data

US 2023/0229199 A1    Jul. 20, 2023

Related U.S. Application Data

(63) Continuation of application No. PCT/KR2022/014769, filed on Sep. 30, 2022.

(30) Foreign Application Priority Data

Nov. 30, 2021    (KR) .................. 10-2021-0168157

(51) Int. Cl.
    *G06F 1/16*    (2006.01)
(52) U.S. Cl.
    CPC .......... *G06F 1/1656* (2013.01); *G06F 1/1616* (2013.01); *G06F 1/1681* (2013.01)
(58) Field of Classification Search
    CPC combination set(s) only.
    See application file for complete search history.

(56) References Cited

U.S. PATENT DOCUMENTS

| 11,435,779 B2 * | 9/2022 | Lee ..................... G06F 1/1656 |
| 11,592,865 B2 * | 2/2023 | Moon ................... G06F 1/1637 |

(Continued)

FOREIGN PATENT DOCUMENTS

| CN | 109637377 A | 4/2019 |
| JP | 2006-113501 A | 4/2006 |

(Continued)

OTHER PUBLICATIONS

International Search Report (PCT/ISA/210) issued by the International Searching Authority on Dec. 14, 2022 in International Application No. PCT/KR2022/014769.

(Continued)

*Primary Examiner* — Lisa Lea-Edmonds
(74) *Attorney, Agent, or Firm* — Sughrue Mion, PLLC

(57) ABSTRACT

An electronic device includes a display including a first area and a second area; a foldable housing including a first housing which supports the first area and a second housing which supports the second area; a hinge structure which connects the first housing and the second housing to be foldable relative to each other on a folding axis between a first state in which the first area and the second area are substantially coplanar, and a second state in which the first area and the second area face each other; and a protection structure provided on the display. At least a portion of the protection structure is included in the foldable housing, wherein the foldable housing may further include a front surface, a rear surface opposite to the front surface, and a side surface which encloses an inner space between the front surface and the rear surface. The protection structure, from a perspective facing the front surface of the foldable housing in the first state, covers at least some of a space between the display and the side surface of the foldable housing.

20 Claims, 17 Drawing Sheets

(56) References Cited

U.S. PATENT DOCUMENTS

| | | | |
|---|---|---|---|
| 11,615,721 B2* | 3/2023 | Park | G06F 3/0412 |
| | | | 313/511 |
| 11,846,986 B2* | 12/2023 | Lee | G06F 1/1656 |
| 11,907,017 B2* | 2/2024 | Nakamura | G02F 1/1335 |
| 11,956,985 B2* | 4/2024 | Park | H10K 50/87 |
| 12,045,089 B2* | 7/2024 | Moon | H05K 5/0226 |
| 2017/0374749 A1 | 12/2017 | Lee et al. | |
| 2019/0196549 A1 | 6/2019 | Lin et al. | |
| 2020/0249723 A1 | 8/2020 | Mizoguchi et al. | |
| 2020/0264664 A1 | 8/2020 | Mizoguchi et al. | |
| 2020/0266384 A1 | 8/2020 | Choi et al. | |
| 2021/0004049 A1 | 1/2021 | Park et al. | |
| 2021/0191460 A1* | 6/2021 | Lee | H04M 1/0268 |
| 2021/0294383 A1 | 9/2021 | Kim et al. | |
| 2022/0336772 A1* | 10/2022 | Choi | G06F 1/1656 |
| 2022/0404868 A1* | 12/2022 | Lee | H04M 1/0268 |
| 2023/0156930 A1* | 5/2023 | Shin | G06F 3/046 |
| | | | 345/174 |
| 2023/0184998 A1* | 6/2023 | Seo | G02B 1/14 |
| | | | 359/601 |
| 2023/0229199 A1* | 7/2023 | Lee | G06F 1/1656 |
| | | | 361/679.27 |
| 2024/0099049 A1* | 3/2024 | Choi | H05K 5/0226 |
| 2024/0111331 A1* | 4/2024 | Lee | G06F 1/1616 |
| 2024/0143035 A1* | 5/2024 | Nakamura | G06F 1/1616 |
| 2024/0251587 A1* | 7/2024 | Park | G02F 1/133331 |

FOREIGN PATENT DOCUMENTS

| | | |
|---|---|---|
| JP | 2020-126297 A | 8/2020 |
| KR | 10-2018-0001818 A | 1/2018 |
| KR | 10-2021-0024943 A | 3/2021 |
| WO | 2020/171449 A1 | 8/2020 |
| WO | 2020171562 A1 | 8/2020 |

OTHER PUBLICATIONS

Communication issued Nov. 5, 2024 by the European Patent Office in European Patent Application No. 22901544.1.

* cited by examiner

ELECTRONIC DEVICE WITH DISPLAY PROTECTION STRUCTURE

CROSS-REFERENCE TO RELATED APPLICATIONS

This application is a by-pass continuation of International Application No. PCT/KR2022/014769 designating the United States, filed on Sep. 30, 2022, in the Korean Intellectual Property Receiving Office and claiming priority to Korean Patent Application No. 10-2021-0168157, filed on Nov. 30, 2021, in the Korean Intellectual Property Office, the disclosures of which are incorporated by reference herein in their entireties.

BACKGROUND

1. Field

The disclosure relates to an electronic device including a display protection structure.

2. Description of Related Art

With the advancement of technology, electronic devices are diversified into various mobile devices, such as a smartphone or a tablet personal computer (PC). A mobile electronic device has been developed in various forms to improve portability and a user's convenience. Recently, there has been a growing demand for a foldable electronic device of which a display is foldable, and accordingly, providing high portability and a large screen.

SUMMARY

A display applied to a foldable electronic device may have a multi-layer structure. While the foldable electronic device is being used, the display may slip when folded or may move when falling. To decrease damage from a slip or fall, there may be a gap between the display and a protection structure (e.g., a housing). However, the gap between the display and the protection structure may decrease the aesthetics of the foldable electronic device, or a foreign material from outside the foldable electronic device may enter, or a user's finger may be caught in the gap.

Accordingly, embodiments may cover the gap between the display and the protection structure while decreasing damage to the display.

Provided is an electronic device including a display protection structure.

Also provided is an electronic device of which visual aesthetics is improved while damage to an edge of a display is prevented.

The technical goals to be achieved through embodiments of the present disclosure are not limited to those described above, and other technical goals not mentioned above are clearly understood by one of ordinary skill in the art from the following description.

Additional aspects will be set forth in part in the description which follows and, in part, will be apparent from the description, or may be learned by practice of the presented embodiments.

According to an aspect of the disclosure, an electronic device includes: a display including a first area and a second area; a foldable housing including a first housing which supports the first area and a second housing which supports the second area; a hinge structure which connects the first housing and the second housing to be foldable relative to each other on a folding axis between a first state in which the first area and the second area are substantially coplanar, and a second state in which the first area and the second area face each other; and a protection structure provided on the display, wherein at least a portion of the protection structure is included in the foldable housing. The foldable housing may further include a front surface including the display, a rear surface opposite to the front surface, and a side surface which encloses an inner space between the front surface and the rear surface. The protection structure, from a perspective facing the front surface of the foldable housing in the first state, covers at least some of a space between the display and the side surface of the foldable housing.

The protection structure may include: a cover member which connects an edge of the display to the side surface of the foldable housing along a circumference of the display, and a protection member attached to the display. From the perspective facing the front surface of the electronic device, the protection member may cover a surface of the display and the cover member facing the front surface of the foldable housing.

The cover member may include: a base layer having a first edge between the display and the protection member, and a second edge between the protection member and the side surface of the foldable housing; a first bonding layer stacked on a first base surface of the base layer facing the protection member, and which bonds the base layer to the protection member; and a second bonding layer stacked on a second base surface opposite to the first base surface, and which bonds the base layer to the side surface of the foldable housing.

According to an aspect of the disclosure, a display includes: a display provided on a front side of a foldable housing which is foldable on a folding axis; a cover member provided on a surface of the display along a circumference of an edge of the display; and a protection member attached to the display and which covers a surface of the cover member and the display. The cover member includes: a base layer having a first edge between the display and the protection member and a second edge between the display and the foldable housing; a first bonding layer which is stacked on a first base surface of the base layer facing the protection member, and bonds the base layer to the protection member; and a second bonding layer which is stacked on at least some of a second base surface opposite to the first base surface, and bonds the base layer to the foldable housing.

According to an aspect of the disclosure, an electronic device includes: a display including a first area and a second area; a foldable housing including: a first housing which supports the first area, a second housing which supports the second area, and a side surface member which encloses a space between a front surface on which the display is visually exposed to an outside of the electronic device, and a rear surface opposite to the front surface; a hinge structure which connects the first housing and the second housing to be foldable relative to each other on a folding axis between a first state in which the first area and the second area are substantially coplanar, and a second state in which the first area and the second area face each other; a protection member which covers a surface of the display; and a cover member which covers an edge of the display to the side surface member of the display along a circumference of the display. A surface of the cover member which faces the front surface of the foldable housing is covered by the protection member, and wherein from a perspective facing the front surface of the foldable housing, a portion of the cover member which is connected to the display is disposed between the display and the protection member.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
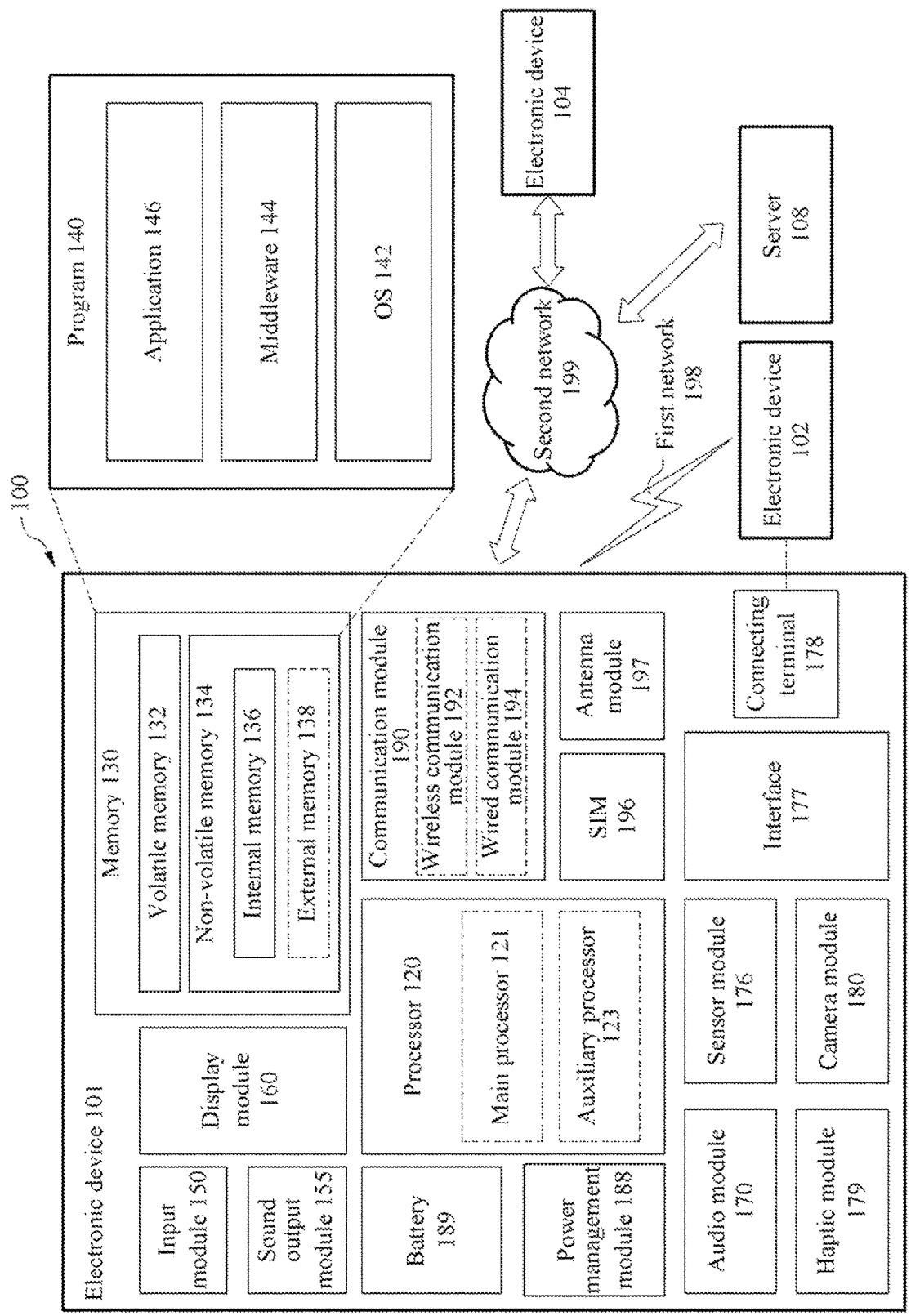
FIG. 1 is a block diagram illustrating an electronic device in a network environment according to an embodiment.

Hereinafter, various embodiments will be described in greater detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include any one or any combination of a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include a slit antenna, and/or an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to various embodiments, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
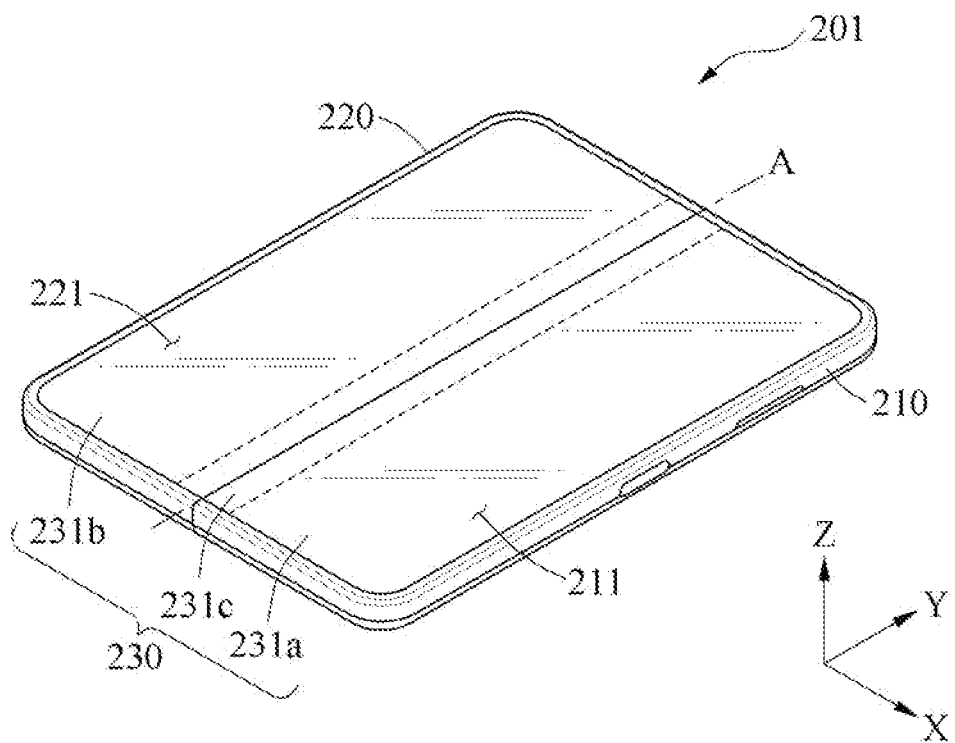
FIGS. 2A and 2B are use state views illustrating an electronic device according to an embodiment.
Figure 2B:
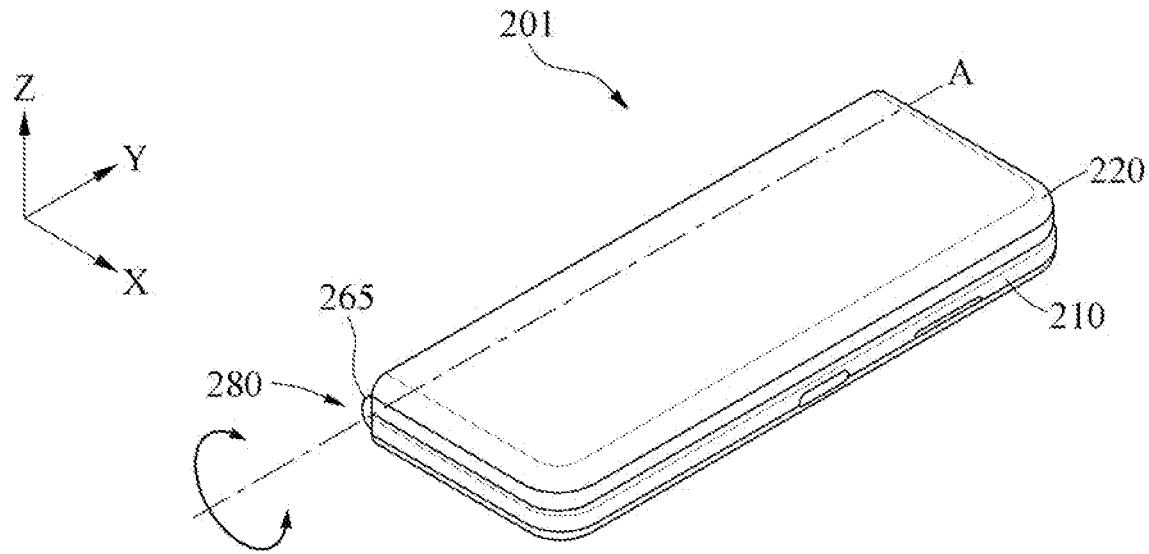

FIGS. 2A and 2B are use state views illustrating an electronic device according to embodiments.

Referring to FIGS. 2A and 2B, the shape of an electronic device 201 (e.g., the electronic device 101 of FIG. 1) may vary depending on a use state. For example, the electronic device 201 may be provided in a foldable type that may be folded or unfolded according to the use state. The electronic device 201 may include a display 230, a first housing 210, a second housing 220, and a hinge structure 280.

The display 230 may display visual information to a user. At least a partial area of the display 230 may transform into a flat surface or a curved surface such that the shape of the display 230 may be transformed in response to shape transformation (e.g., an opening/closing operation of the electronic device 201 between an open state of FIG. 2A and a closed state of FIG. 2B) of the electronic device 201. The display 230 may include a folding area 231c including a folding axis A, a first area 231a on one side (e.g., the right area of the folding area 231c of FIG. 2A) of the folding area 231c, and a second area 231b on the other side (e.g., the left area of the folding area 231c of FIG. 2A) of the folding area 231c. The overall shape of the display 230 may be transformed in response to the opening and/or closing operation of the electronic device 201 as a relative angle formed by the first area 231a and the second area 231b is adjusted by the folding area 231c. For example, the shape of the display 230 may transform into a first state (e.g., a completely open state of FIG. 2A) in which the first area 231a and the second area 231b form substantially the same plane, an intermediate state in which the first area 231a and the second area 231b form a predetermined angle, or a second state (e.g., a folded state of FIG. 2B) in which the first area 231a and the second area 231b face each other.

The first area 231a and the second area 231b may have generally symmetrical shapes with respect to the folding area 231c. However, the first area 231a or the second area 231b may include a notch area that is partially cut by another component, which is exposed on the front surface of the electronic device 201, and accordingly, some of the first area 231a or the second area 231b may have asymmetrical shapes. However, the areal division of the display 230 described above is an example, and embodiments are not limited thereto. For example, the display 230 may be divided into a plurality of areas according to functions and structures needed for the electronic device 201. For example, the areas of the display 230 are illustrated in FIG. 2A as being divided based on the folding axis A or folding area parallel to the y-axis. In addition, as another example, areas of the display 230 may be divided based on another folding axis A (e.g., a folding axis A parallel to the x-axis) or another folding area (e.g., a folding area parallel to the x-axis).

The first housing 210 and the second housing 220 may form the exterior of the electronic device 201. The first housing 210 and the second housing 220 may be connected to the hinge structure 280 and may form the rear surface of the electronic device 201. The first housing 210 and the second housing 220 may each include a side surface partially covering the front surface, the rear surface, and a space between the front and rear surfaces of the electronic device 201. In this case, the front surface of the electronic device 201 may have a mostly open area such that the display 230 may be visually exposed to the outside of the electronic device 201. Hereinafter, for convenience of description, a surface on which the display 230 is visually exposed to the outside of the electronic device 201 may be referred to as the front surface of the electronic device 201, an opposite surface of the front surface may be referred to as the rear surface of the electronic device 201, and a surface enclosing a space between the front surface and the rear surface thereof may be referred to as the side surface of the electronic device 201, however embodiments are not limited thereto.

The first housing 210 and the second housing 220 may each be connected to the rear surface of the display 230 and may respectively support the first area 231a and the second area 231b of the display 230. For example, the first housing 210 may support the rear surface of the first area 231a and may form a first space 211 on the rear surface of the first area 231a, and the second housing 220 may support the rear surface of the second area 231b and may form a second space 221 on the rear surface of the second area 231b. The first space 211 and the second space 221 may form a space where the display 230 sits by connecting the first housing 210 and the second housing 220 to each other.

The hinge structure 280 may foldably connect the first housing 210 and the second housing 220 to each other. The first housing 210 and the second housing 220 may relatively rotate on the folding axis A through the hinge structure 280. In this case, an angle between the first housing 210 and the second housing 220 may be adjusted depending on a using operation of the electronic device 201. Since the display 230 is supported by the first housing 210 and the second housing 220, an angle between the first area 231a and the second area 231b of the display 230 may vary in response to folding and unfolding operations of the first housing 210 and the second housing 220.

In the first state (e.g., the completely open state of FIG. 2A) of the electronic device 201, the first housing 210 and the second housing 220 may substantially form 180 degrees through the hinge structure 280. In this case, the first area 231a and the second area 231b of the display 230 may face the same direction (e.g., the z-axis) and may form substantially the same plane. On the other hand, in the second state (e.g., the folded state of FIG. 2B) of the electronic device 201, the first housing 210 and the second housing 220 may substantially face each other through the hinge structure 280. In this case, the first area 231a and the second area 231b of the display 230 may not be visually exposed to the outside of the electronic device 201 by forming a narrow angle (e.g., a range between 0 to 10 degrees) based on the folding axis A and facing each other. In the second state, the folding area 231c of the display 230 may form a curved surface having a predetermined curvature. When the electronic device 201 is in the intermediate state, the first housing 210 and the second housing 220 may form a predetermined angle between each other through the hinge structure 280. In this case, the first area 231a and the second area 231b of the display 230 may form an angle less than that in the first state and greater than that in the second state based on the folding axis A. In the intermediate state, the folding area 231c may form a curved surface having a smaller curvature than that in the second state.

Figure 3A:
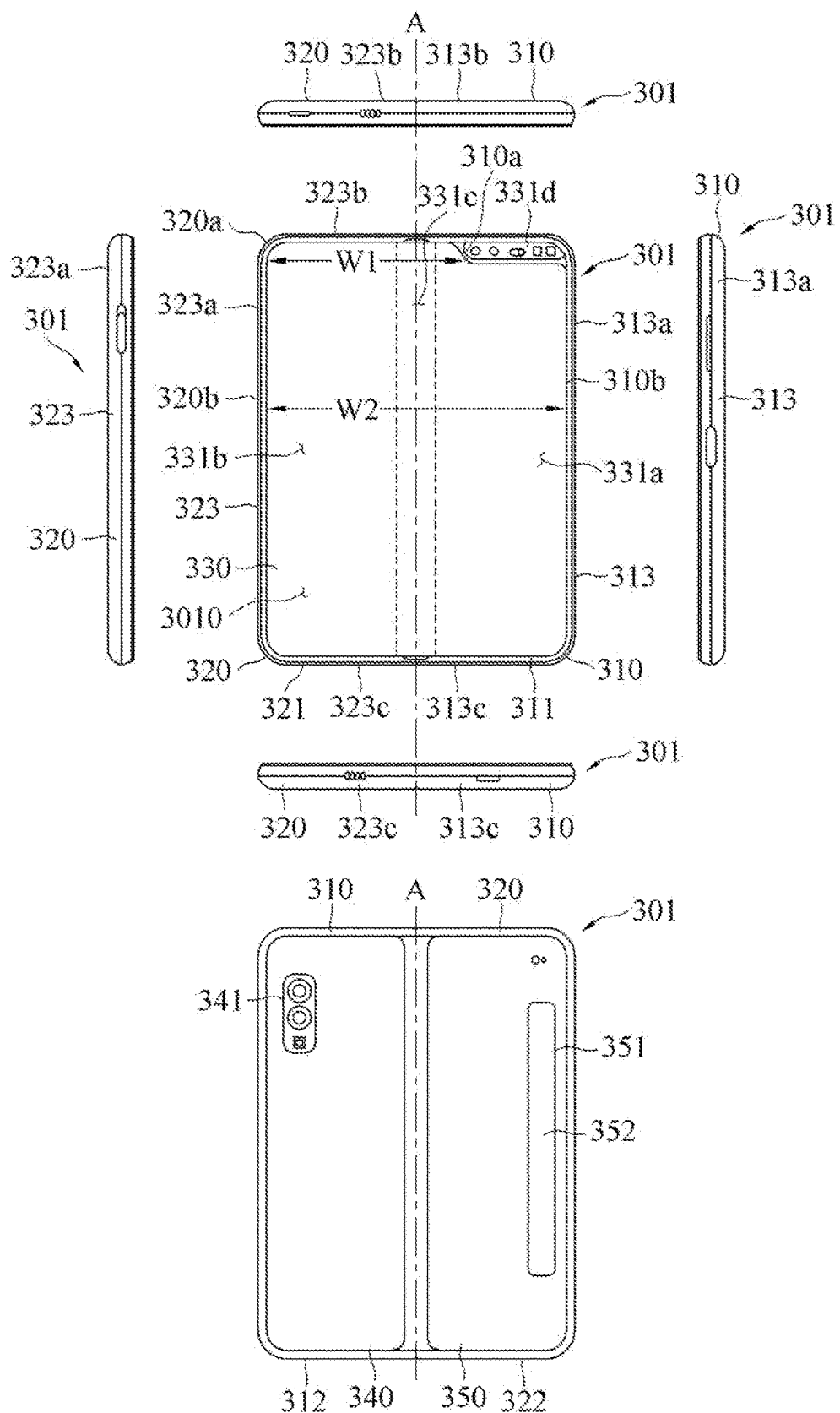
FIG. 3A is a diagram illustrating a first state of an electronic device according to an embodiment.
Figure 3B:
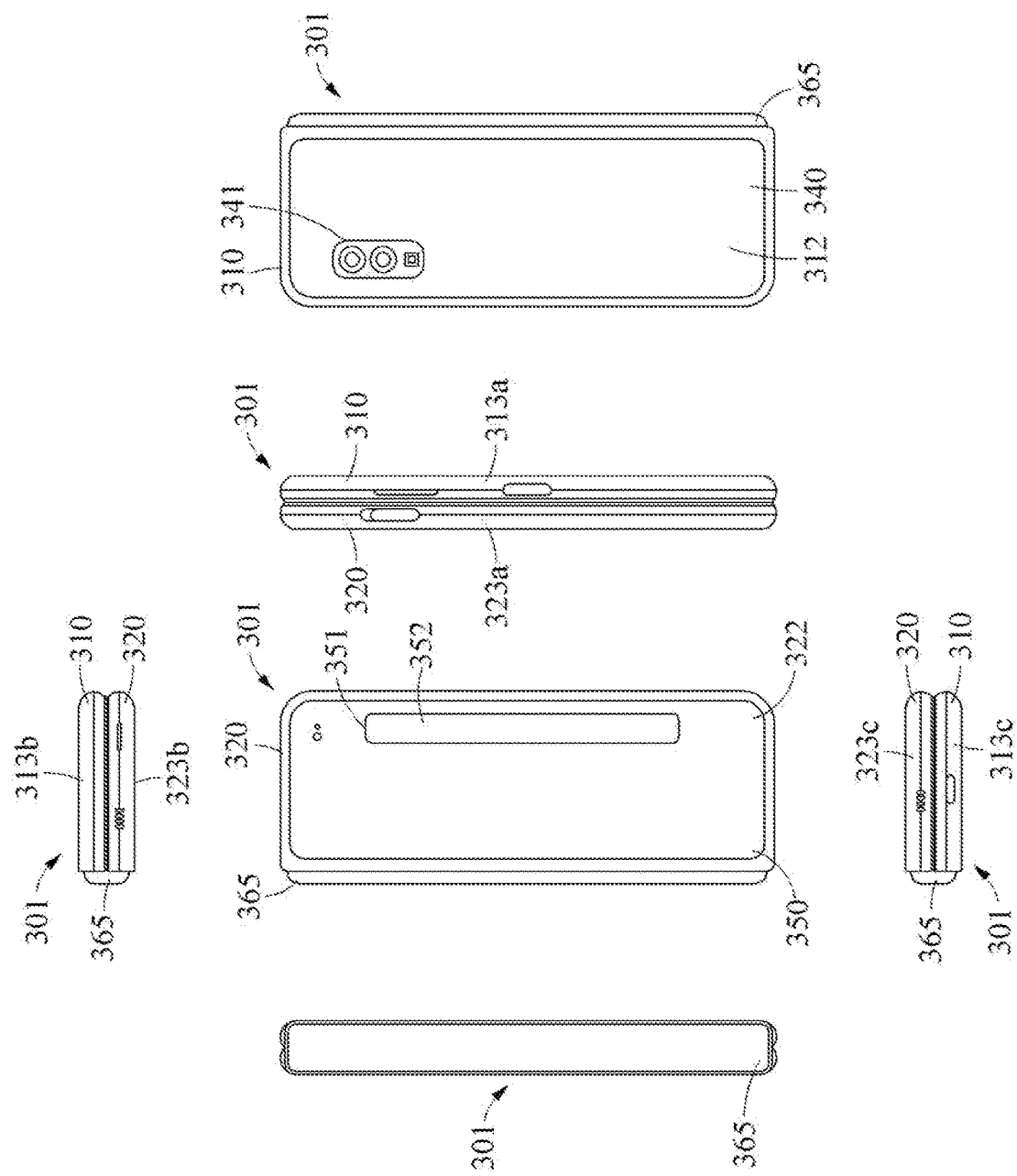
FIG. 3B is a diagram illustrating a second state of the electronic device according to an embodiment.
Figure 3C:
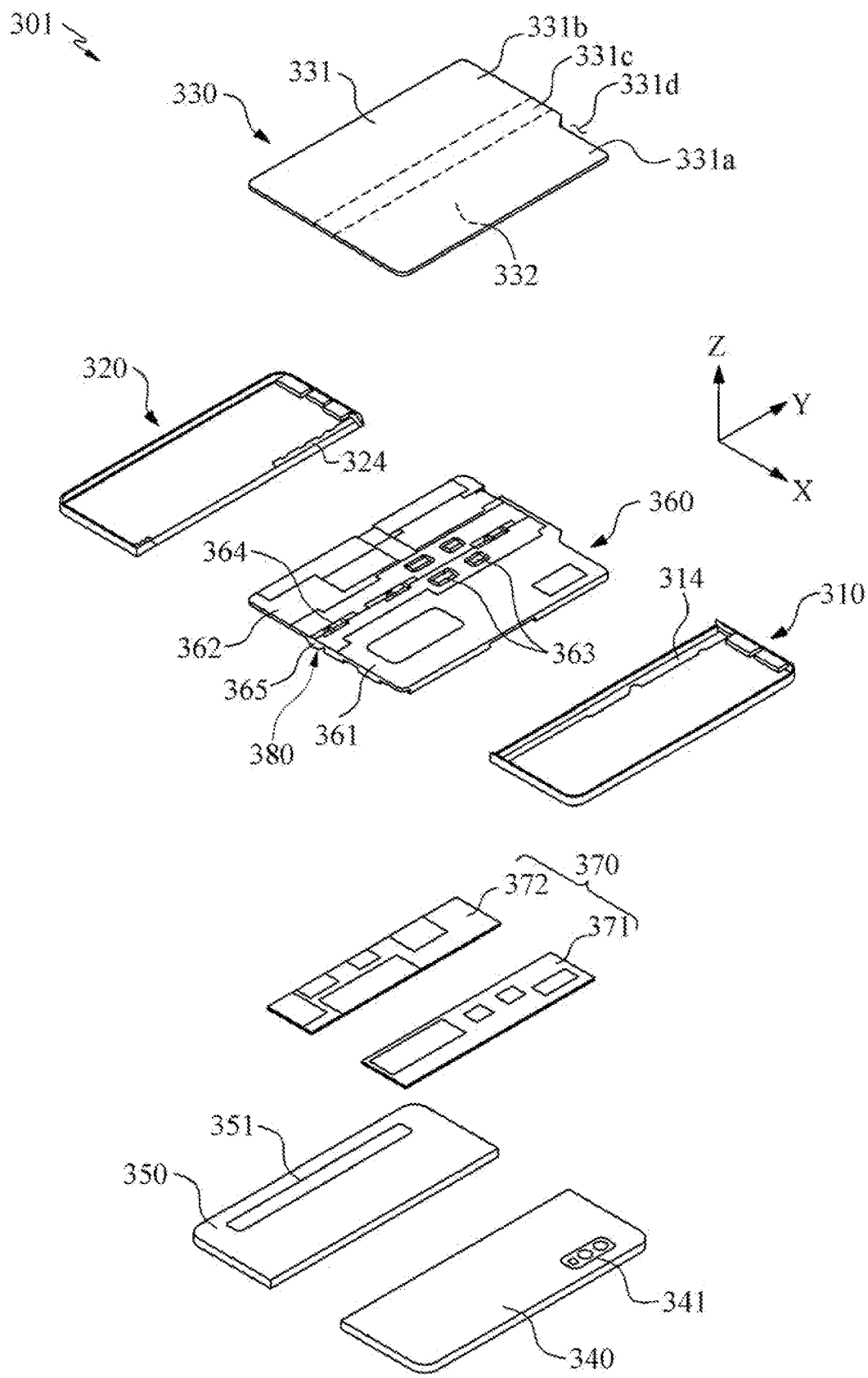
FIG. 3C is an exploded perspective view illustrating the electronic device according to an embodiment.

FIG. 3A is a diagram illustrating a first state of an electronic device according to an embodiment, FIG. 3B is a diagram illustrating a second state of an electronic device according to an embodiment, and FIG. 3C is an exploded perspective view illustrating an electronic device according to an embodiment.

Referring to FIGS. 3A, 3B, and 3C, an electronic device 301 (e.g., the electronic device 101 of FIG. 1 and the electronic device 201 of FIG. 2A) may include a pair of first and second housings 310 and 320 rotatably connected to each other through a hinge structure and folding facing each other, a hinge cover 365 for covering foldable portions of the pair of first and second housings 310 and 320, a display 330 (e.g., a flexible display or a foldable display) in a space formed by the pair of first and second housings 310 and 320, a hinge assembly 360, and a substrate 370.

In an embodiment, the electronic device 301 may include the first housing 310 including a sensor area 331d, the second housing 320, a first rear cover 340, and a second rear cover 350. The pair of first and second housings 310 and 320 of the electronic device 301 are not limited to the shapes or the combination and/or coupling of components illustrated in FIGS. 3A and 3B and may be implemented in other shapes or by another combination and/or coupling of components.

In an embodiment, the first housing 310 and the second housing 320 may be on both sides of the folding axis A and may be substantially symmetrical to the folding axis A. An angle or a distance between the first housing 310 and the second housing 320 may vary depending on whether the electronic device 301 is in an unfolded state, a folded state, or an intermediate state. In an embodiment, unlike the second housing 320, the first housing 310 may include a sensor area 331d accommodating various sensor modules (e.g., the sensor module 176 of FIG. 1), and the first housing 310 and the second housing 320 may have shapes symmetrical to each other in areas other than the sensor area 331d. In another embodiment, the sensor area 331d may be replaced with at least a partial area of the second housing 320. The sensor area 331d may include, for example, a camera hole area, a sensor hole area, an under-display camera (UDC) area, and/or an under-display sensor (UDS) area.

In an embodiment, the first housing 310 may be connected to a hinge structure in the unfolded state of the electronic device 301. The first housing 310 may include a first surface 311, a second surface 312, and a first side portion 313, in which the first surface 311 faces the front surface of the electronic device 301, the second surface 312 faces a direction opposite to the first surface 311, and the first side portion 313 encloses at least some of a space between the first surface 311 and the second surface 312. The first side portion 313 may include a first side surface 313a, a second side surface 313b, and a third side surface 313c, in which the first side surface 313a is substantially parallel to the folding axis A, the second side surface 313b extends in a direction substantially perpendicular to the folding axis A from an edge of the first side surface 313a, and the third side surface 313c extends in a direction substantially perpendicular to the folding axis A from another edge of the first side surface 313a and substantially parallel to the second side surface 313b. The second housing 320 may be connected to the hinge structure in the unfolded state of the electronic device 301. The second housing 320 may include a third surface 321, a fourth surface 322, and a second side portion 323, in which the third surface 321 faces the front surface of the electronic device 301, the fourth surface 322 faces a direction opposite to the third surface 321, and the second side portion 323 encloses at least some of a space between the third surface 321 and the fourth surface 322. The second side portion 323 may include a fourth side surface 323a, a fifth side surface 323b, and a sixth side surface 323c, in which the fourth side surface 323a is substantially parallel to the folding axis A, the fifth side surface 323b extends in a direction substantially perpendicular to the folding axis A from an edge of the fourth side surface 323a, and the sixth side surface 323c extends in a direction substantially perpendicular to the folding axis A from another edge of the fourth side surface 323a and substantially parallel to the fifth side surface 323b. The first surface 311 and the third surface 321 may face each other when the electronic device 301 is in the folded state.

In an embodiment, the electronic device 301 may include an accommodating portion 3010 that is recessed and may accommodate the display 330 through the structural coupling of the first housing 310 and the second housing 320. The accommodating portion 3010 may have substantially the same size as the display 330. In an embodiment, due to the sensor area 331d, the accommodating portion 3010 may have at least two different widths in a direction perpendicular to the folding axis A. For example, the accommodating portion 3010 may have a first width W1 and a second width W2. In an embodiment, the first width W1 may be between a first portion 310a of the first housing 310, which may be formed on an edge of the sensor area 331d, and a second portion 320a of the second housing 320 parallel to the folding axis A. In an embodiment, the second width W2 may be between a third portion 310b of the first housing 310, which may be parallel to the folding axis A and not overlapping the sensor area 331d, and a fourth portion 320b of the second housing 320. In this case, the second width W2 may be greater than the first width W1.

In other words, the accommodating portion 3010 may have the first width W1 from the first portion 310a of the first housing 310 to the second portion 320a of the second housing 320, which are mutually asymmetrical, and the second width W2 from the third portion 310b of the first housing 310 to the fourth portion 320b of the second housing 320. The first portion 310a and the third portion 310b of the first housing 310 may have different distances from the folding axis A. However, the widths of the accommodating portion 3010 illustrated in the drawings are not limited to the foregoing examples. For example, the accommodating portion 3010 may have three or more different widths because of the shapes of the sensor area 331d or the asymmetric shape of the first housing 310 and the second housing 320.

In an embodiment, at least some of the first housing 310 and the second housing 320 may be formed from a metal material or a non-metal material having rigidity sufficient to support the display 330.

In an embodiment, the sensor area 331d may be adjacent to one corner of the first housing 310. However, the arrangement, the shape, or the size of the sensor area 331d is not limited to the illustrated example. In another embodiments, the sensor area 331d may be at another corner of the first housing 310 or in a predetermined area of an upper corner and a lower corner of the first housing 310. In an embodiment, the sensor area 331d may have a shape extending between the first housing 310 and the second housing 320.

In an embodiment, the electronic device 301 may include at least one component to be exposed on the front surface of the electronic device 301 through the sensor area 331d or at least one opening in the sensor area 331d. For example, the component may include at least one of a front camera module, a receiver, a proximity sensor, an illuminance sensor, an iris recognition sensor, an ultrasonic sensor, and an indicator.

In an embodiment, the first rear cover 340 may be on the second surface 312 of the first housing 310 and may have a substantially rectangular periphery. The first housing 310 may enclose at least some of the edge of the first rear cover 340. The second rear cover 350 may be on the fourth surface 322 of the second housing 320 and may have a substantially rectangular periphery. The second housing 320 may enclose at least some of the edge of the second rear cover 350.

In an embodiment, the first rear cover 340 and the second rear cover 350 may have substantially symmetrical shapes based on the folding axis A. In another embodiment, the first rear cover 340 and the second rear cover 350 may have different shapes. In another embodiment, the first housing 310 and the first rear cover 340 may be formed integrally as one body, and the second housing 320 and the second rear cover 350 may be formed integrally as one body.

In an embodiment, the first housing 310, the second housing 320, the first rear cover 340, and the second rear cover 350 may provide a space in which various components (e.g., a PCB, the antenna module 197 of FIG. 1, the sensor module 176 of FIG. 1, or the battery 189 of FIG. 1) of the electronic device 301 may be arranged through a structure in which the first housing 310, the second housing 320, the first rear cover 340, and the second rear cover 350 are coupled to one another. In an embodiment, at least one component on the rear surface of the electronic device 301 may be visually exposed to the outside of the electronic device 301. For example, at least one component may be visually exposed, through a first rear area 341 of the first rear cover 340, to the outside of the electronic device 301. In this case, the component may include a proximity sensor, a rear camera module, and/or a flash. In an embodiment, at least some of a sub-display 352 may be visually exposed, through a second rear area 351 of the second rear cover 350, to the outside of the electronic device 301. In an embodiment, the electronic device 301 may include a sound output module (e.g., the sound output module 155 of FIG. 1) accommodated by at least a partial area of the second rear cover 350.

In an embodiment, the display 330 may be in the accommodating portion 3010 formed by the pair of first and second housings 310 and 320. For example, the display 330 may be arranged to occupy substantially most of the front surface of the electronic device 301. The front surface of the electronic device 301 may include an area accommodating the display 330, a partial area (e.g., an edge area) of the first housing 310 adjacent to the display 330, and a partial area (e.g., an edge area) of the second housing 320. The rear surface of the electronic device 301 may include the first rear cover 340, a partial area (e.g., an edge area) of the first housing 310 adjacent to the first rear cover 340, the second rear cover 350, and a partial area (e.g., an edge area) of the second housing 320 adjacent to the second rear cover 350. In an embodiment, the display 330 may be a display in which at least some area is transformable into a planar surface or a curved surface. In an embodiment, the display 330 may include a folding area 331c, a first area 331a on a first side (e.g., the right side) of the folding area 331c, and a second area 331b on a second side (e.g., the left side) of the folding area 331c. For example, the first area 331a may be on the first surface 311 of the first housing 310 and the second area 331b may be on the third surface 321 of the second housing 320. However, the area division of the display 330 is merely an example, and the display 330 may be divided into a plurality of areas depending on the structure or functions of the display 330. The area division of the display 330 is merely a physical division based on the pair of first and second housings 310 and 320 and a hinge structure, and the display 330 may display substantially one screen through the pair of first and second housings 310 and 320 and the hinge structure. In an embodiment, the first area 331a may include a notch area formed along the sensor area 331d, but the other areas of the first area 331a may be substantially symmetrical to the second area 331b. In another embodiment, as the sensor area 331d is not exposed in the first area 331a or the second area 331b, the first area 331a and the second area 331b may have substantially symmetrical shapes based on the folding axis A.

In an embodiment, the hinge cover 365 may be between the first housing 310 and the second housing 320 and configured to cover the hinge structure. The hinge cover 365 may be hidden by at least some of the first housing 310 and the second housing 320 or exposed to the outside of the electronic device 301 according to the operating state of the electronic device 301. For example, when the electronic device 301 is in an unfolded state as illustrated in FIG. 3A, the hinge cover 365 may be hidden by the first housing 310 and the second housing 320 and not exposed to the outside of the electronic device 301, and when the electronic device 301 is in a folded state as illustrated in FIG. 3B, the hinge cover 365 may be exposed to the outside of the electronic device 301 between the first housing 310 and the second housing 320. When the electronic device 301 is in an intermediate state in which an angle is formed that is between the unfolded state, as illustrated in FIG. 3A, and the folded state, as illustrated in FIG. 3B, at least some of the hinge cover 365 may be exposed to the outside of the electronic device 301 between the first housing 310 and the second housing 320, and in this case, the area, of the hinge cover 365, exposed to the outside of the electronic device 301 may be less than the area of the hinge cover 365 exposed when the electronic device 301 is in the folded state. In an embodiment, the hinge cover 365 may include a curved shape.

In an embodiment, when the electronic device 301 is in an unfolded state (e.g., the unfolded state of FIG. 3A), the first housing 310 and the second housing 320 may form a first angle (e.g., about 180 degrees) with each other, and the first area 331a and the second area 331b of the display 330 may be oriented in substantially the same direction. The folding area 331c of the display 330 may be on substantially the same plane as the first area 331a and the second area 331b. In another embodiment, when the electronic device 301 is in the unfolded state, the first housing 310 may rotate at a second angle (e.g., about 360 degrees) on the second housing 320, and accordingly, the first housing 310 may be reversely folded such that the second surface 312 and the fourth surface 322 may face each other. Moreover, when the electronic device 301 is in the folded state (e.g., the folded state of FIG. 3B), the first housing 310 and the second housing 320 may face each other. The first housing 310 and the second housing 320 may form an angle of about 0 to 10 degrees and the first area 331a and the second area 331b of the display 330 may face each other. In this case, at least some of the folding area 331c of the display 330 may be transformed into a curved surface. In an embodiment, when the electronic device 301 is in the intermediate state, the first housing 310 and the second housing 320 may form a predetermined angle with each other. In this case, an angle (e.g., a third angle, about 90 degrees) formed by the first area 331a and the second area 331b of the display 330 may be greater than that when the electronic device 301 is in the folded state and less than that when the electronic device 301 is in the unfolded state. In this case, the folding area 331c may be transformed such that a curvature of the folding area 331c is less than that of the curved surface of the electronic device 301 in the folded state.

The display 330 may include a display panel 331 (e.g., a flexible display panel), and at least one plate (or layer) 332 on the rear surface of the display panel 331.

In an embodiment, the display panel 331 may include a flexible display substrate, a plurality of display elements coupled to the display substrate to form pixels, one or more conductive lines coupled to the display substrate and electrically connected to other display elements, and a thin-film encapsulation layer configured to prevent inflow of external oxygen and moisture. The display panel 331 may include a touch panel, or the display panel 331 and the touch panel may be formed integrally as one body.

The display substrate may be formed of a flexible material, for example, a plastic material, such as polyimide (PI). However, the material of the display substrate is not limited thereto and may include various flexible materials. The plurality of display elements may be arranged on the display substrate and form some pixels. For example, the plurality of display elements may be arranged in a matrix form on the display substrate to form pixels of the display panel 331. In this case, the plurality of display elements may include a fluorescent material or an organic fluorescent material capable of expressing colors. For example, the display elements of a display may include organic light-emitting diodes (OLEDs). The conductive lines may include one or more gate signal lines or one or more data signal lines. For example, the conductive lines may include a plurality of gate signal lines and a plurality of data signal lines, and the plurality of gate signal lines and the plurality of data signal lines may be arranged in a matrix form. In this case, the plurality of display elements may be arranged adjacent to a point where a plurality of lines intersect with each other and may be electrically connected to each line. A thin film encapsulation layer may cover the display substrate, the plurality of display elements, and the conductive lines, thereby preventing inflow of external oxygen and moisture. In an embodiment, the thin film encapsulation layer may be formed by alternately stacking one or more organic film layers and one or more inorganic film layers.

In an embodiment, the touch panel may be formed integrally as one body with the display panel 331 or attached thereto. For example, the touch panel may be formed by patterning an aluminum metal mesh sensor on the thin film encapsulation layer of the display panel 331.

In an embodiment, a polarizing film may be stacked between the display panel 331 and the touch panel. The polarizing film may improve the visibility of the display 330. The polarizing film may change the phase of light passing through the display 330. For example, the polarizing film may convert linearly polarized light into circularly polarized light or convert circularly polarized light into linearly polarized light, and accordingly, decrease reflection of light incident to the display panel 331.

A window layer may be formed of a transparent plastic film having high flexibility and high hardness. For example, the window layer may be formed from a PI or polyethylene terephthalate (PET) film. In an embodiment, the window layer may be formed as layers including a plurality of plastic films.

In an embodiment, the plate 332 may support the rear surface of the display panel 331 and improve the impact resistance of the display panel 331. In an embodiment, the plate 332 may be divided into areas to respectively support the rear surface of the first area 331a and the rear surface of the second area 331b of the display panel 331. In this case, respective areas of the plate 332 may be separately attached to the rear surface of the first area 331a and the rear surface of the second area 331b of the display 330, which may not contact each other along the folding axis A. In this structure, the plate 332 may not interfere with the folding operation of the display 330 performed along the folding axis A.

In an embodiment, the plate 332 may be formed of a conductive material, for example, copper or an alloy material including copper. In this case, the plate 332 may function as a heat transfer path through which heat generated by an internal component (e.g., an AP) in the electronic device 301 is transferred to the display panel 331 and improve the impact resistance of the display 330.

The hinge assembly 360 may include a first support plate 361, a second support plate 362, a hinge housing 380, the hinge cover 365, and a wiring member 363 (e.g., a flexible printed circuit board (FPCB)), in which the hinge housing 380 is between the first and second support plates 361 and 362, the hinge cover 365 covers the hinge housing 380 when viewed from the outside of the electronic device 301, and the wiring member 363 traverses the first and second support plates 361 and 362.

In an embodiment, the first support plate 361 may be in a direction of the rear surface of the first area 331a of the display 330, and the second support plate 362 may be in a direction of the rear surface of the second area 331b of the display 330.

In an embodiment, at least some of the hinge structure and the wiring member 363 may be inside the hinge assembly 360. The wiring member 363 may be in a direction (e.g., an x-axis direction) traversing the first and second support plates 361 and 362. The wiring member 363 may be in a direction perpendicular to the folding axis A of the electronic device 301.

The substrate 370 may include a first PCB 371 on the first support plate 361 and a second PCB 372 on the second support plate 362. The first PCB 371 and the second PCB 372 may be in a space formed by the hinge assembly 360, the first housing 310, the second housing 320, the first rear cover 340, and the second rear cover 350. The first PCB 371 and the second PCB 372 may include components for implementing various functions of the electronic device 301. In an embodiment, the first PCB 371 may be in a direction opposite to the first area 331a based on the first support plate 361 and the second PCB 372 may be in a direction opposite to the second area 331b based on the second support plate 362.

The first housing 310 and the second housing 320 may be respectively coupled to both sides of the hinge assembly 360 to which the display 330 has been coupled. For example, the first housing 310 and the second housing 320 may be coupled to the hinge assembly 360 by sliding from both sides of the hinge assembly 360. In an embodiment, the first housing 310 may include a first rotation support surface 314 and the second housing 320 may include a second rotation support surface 324 corresponding to the first rotation support surface 314. The first rotation support surface 314 and the second rotation support surface 324 may include a curved surface corresponding to the curved surface included in the hinge cover 365.

In an embodiment, when the electronic device 301 is in an unfolded state (e.g., the unfolded state of FIG. 3A), the first rotation support surface 314 and the second rotation support surface 324 may cover the hinge cover 365 such that the hinge cover 365 may not be exposed in the rear surface of the electronic device 301 or may be minimally exposed. On the other hand, when the electronic device 301 is in a folded state (e.g., the folded state of FIG. 3B), the first rotation support surface 314 and the second rotation support surface 324 may rotate along the curved surface included in the hinge cover 365 such that the hinge cover 365 may be maximally exposed in the rear surface of the electronic device 301.

Figure 4A:
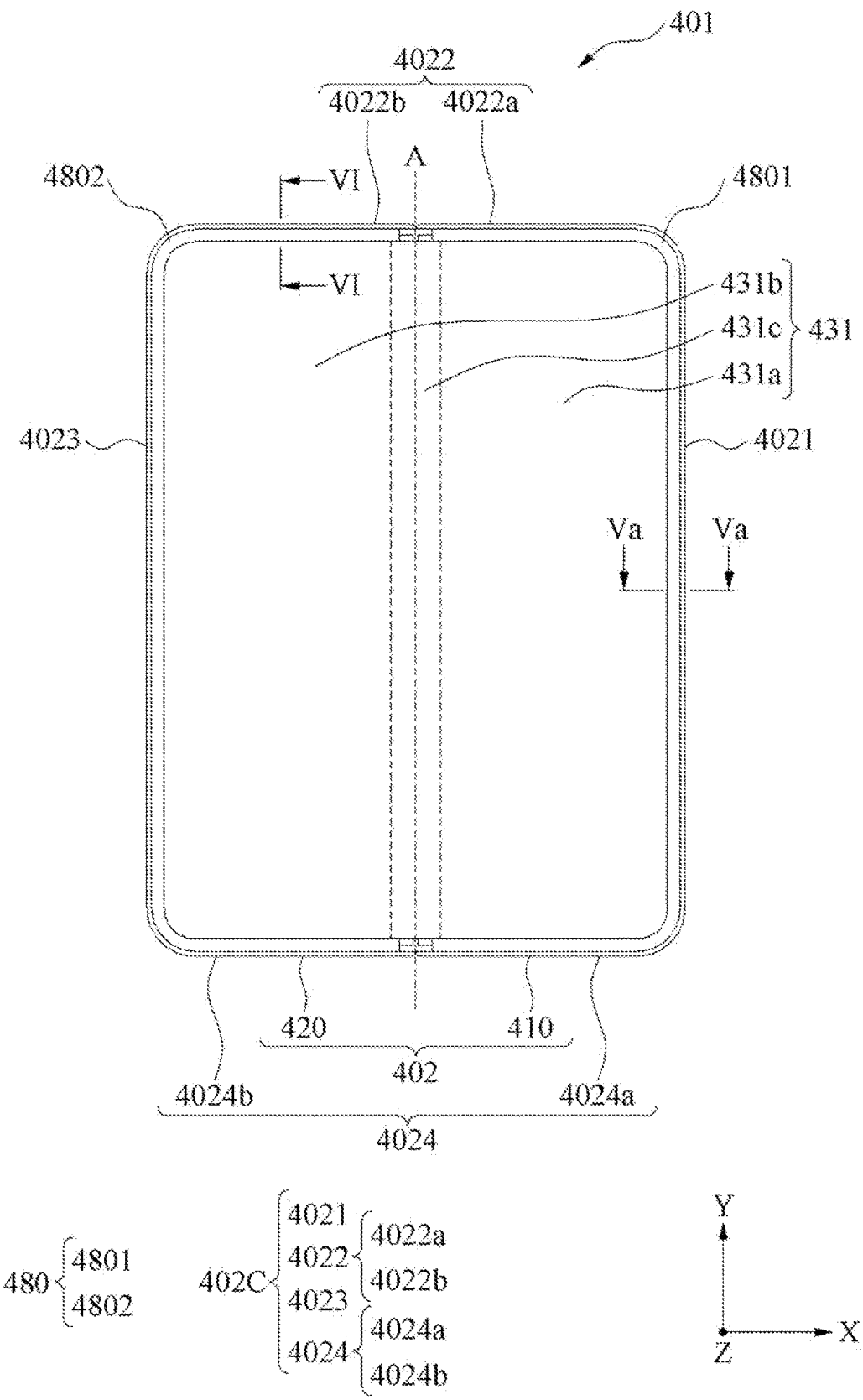
FIG. 4A is a plan view illustrating a display in a first state of an electronic device according to an embodiment.
Figure 4B:
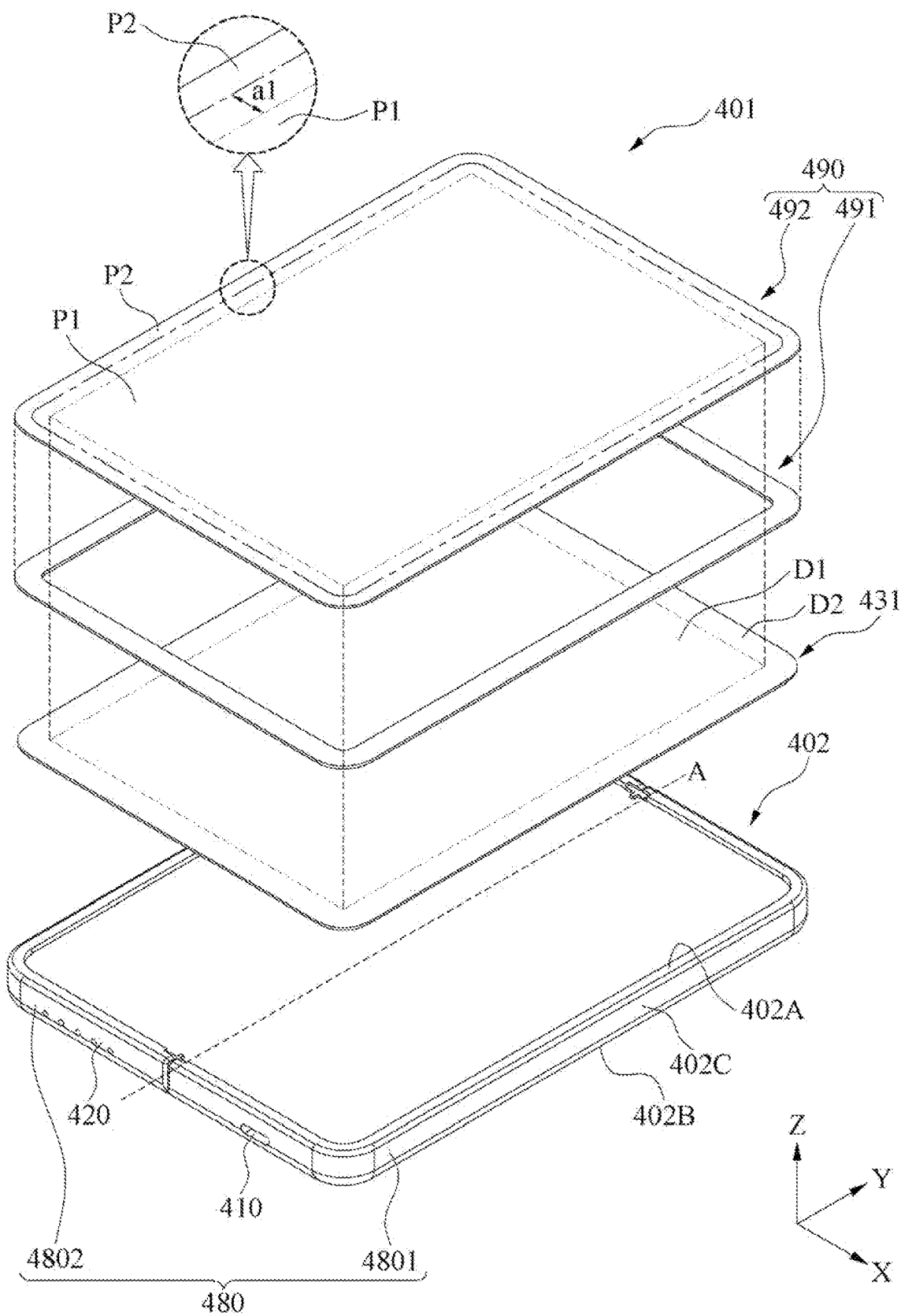
FIG. 4B is an exploded perspective view illustrating a connection between a display and a protection structure in a first state of the electronic device according to an embodiment.
Figure 5A:
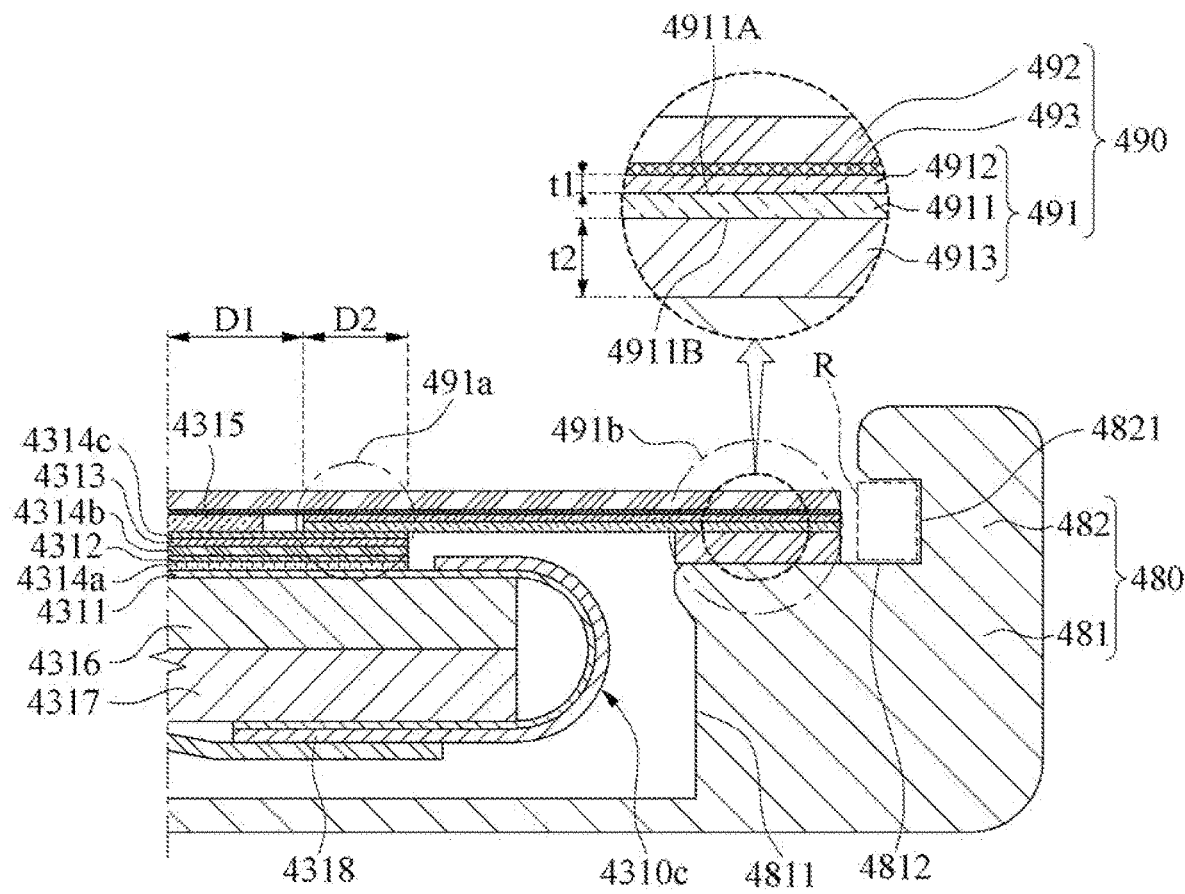
FIG. 5A is a cross-sectional view illustrating an electronic device along a Va-Va line of FIG. 4A according to an embodiment.
Figure 5B:
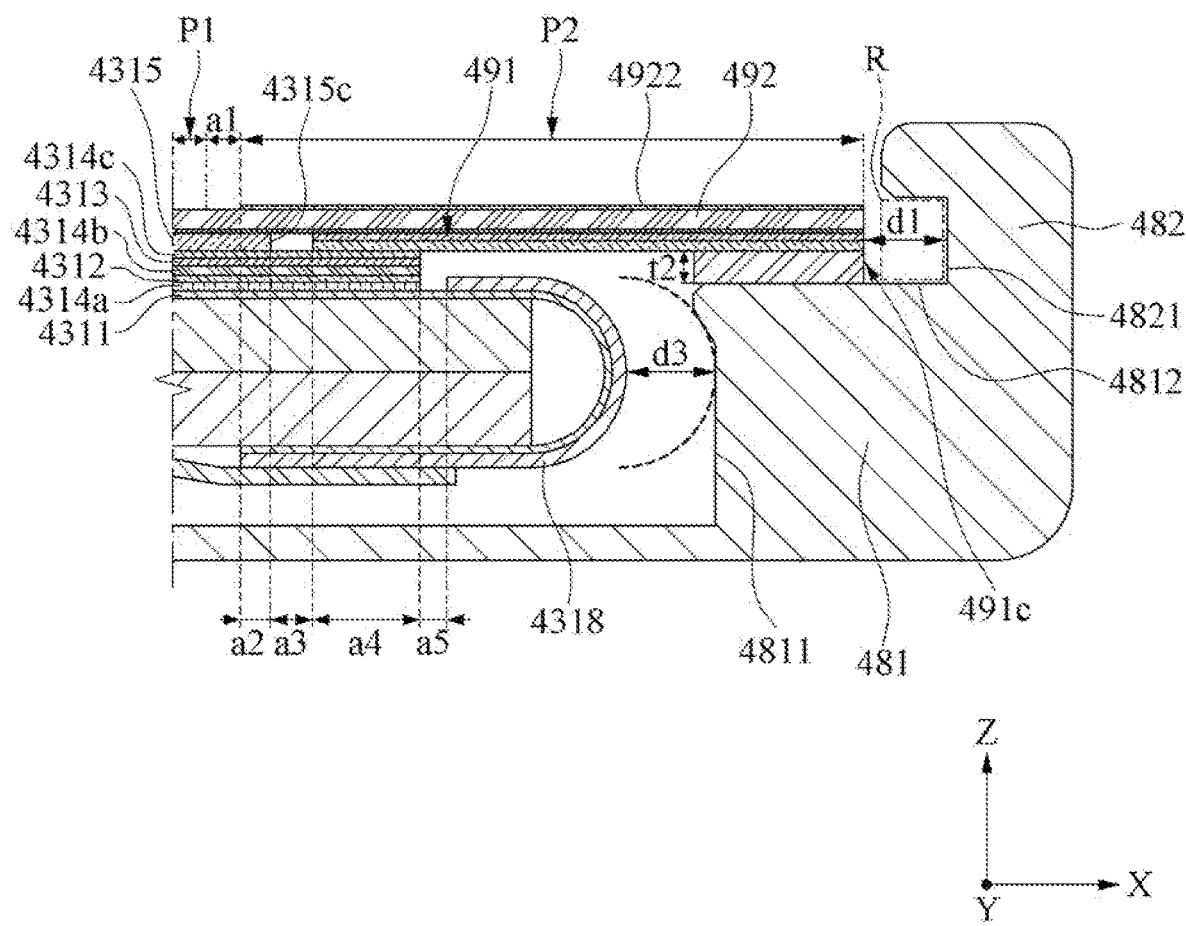
FIG. 5B is another cross-sectional view illustrating the electronic device along the Va-Va line of FIG. 4A according to an embodiment.
Figure 5C:
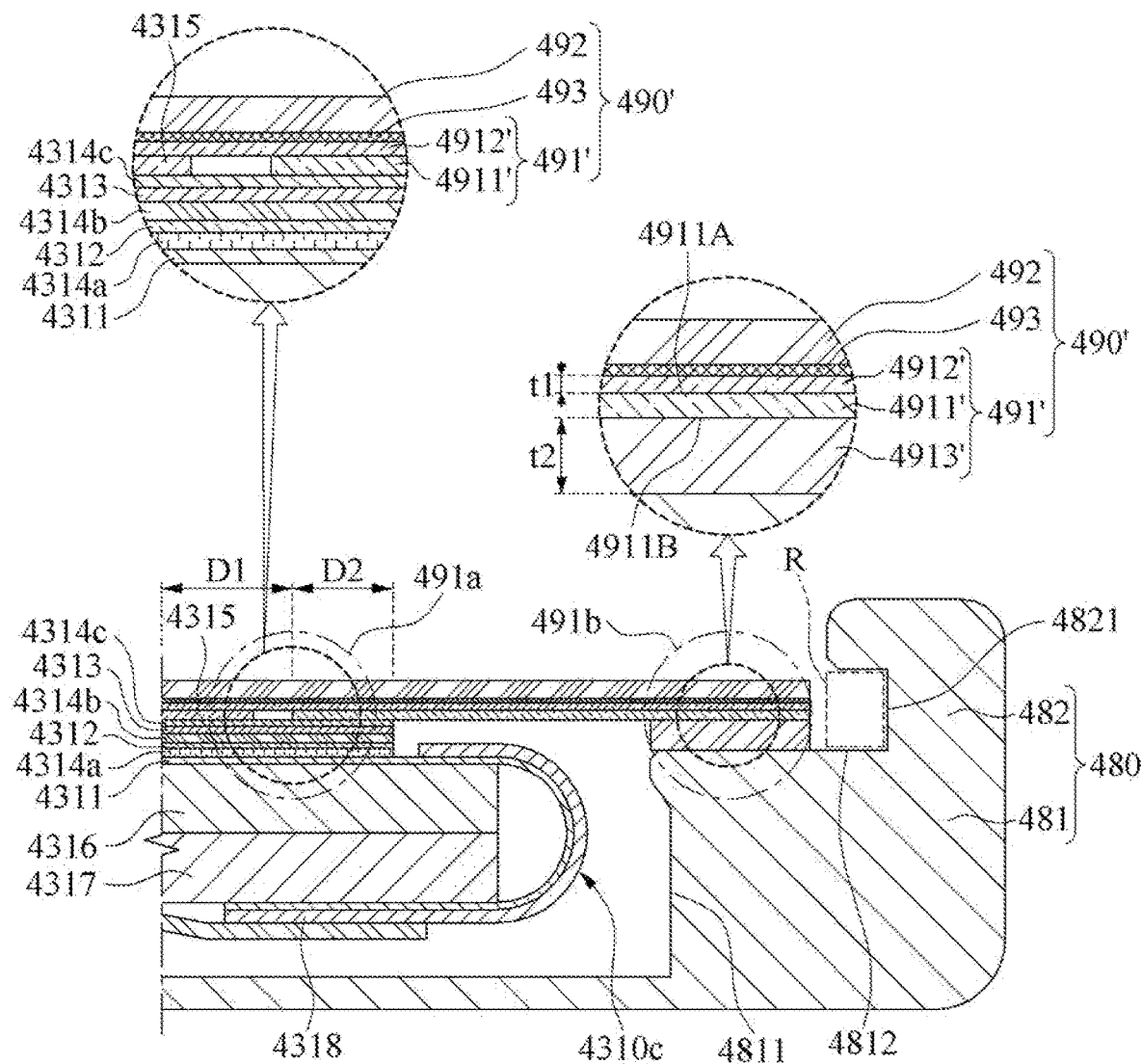
FIG. 5C is another cross-sectional view illustrating the electronic device along the Va-Va line of FIG. 4A according to an embodiment.
Figure 6:
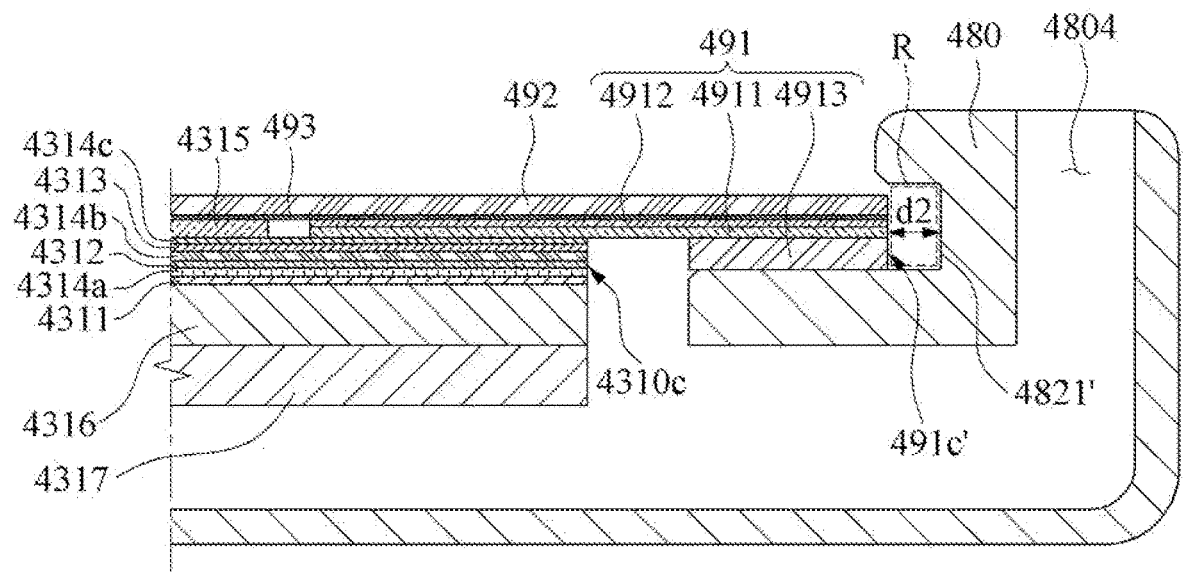
FIG. 6 is a cross-sectional view illustrating an electronic device along a VI-VI line according to an embodiment.
Figure 6:
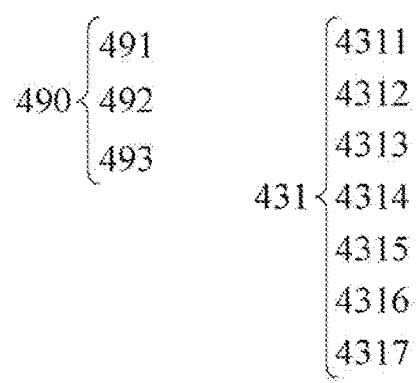
Figure 6:
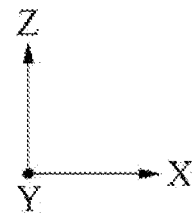

FIG. 4A is a plan view illustrating a display in a first state of an electronic device according to one embodiment, FIG. 4B is an exploded perspective view illustrating a connection between the display and a protection structure in the first state of the electronic device according to one embodiment, FIGS. 5A, 5B, and 5C are a cross-sectional views illustrating the electronic device along a Va-Va line of FIG. 4A, and FIG. 6 is a cross-sectional view illustrating the electronic device along a VI-VI line.

Referring to FIGS. 4A, 4B, 5A, 5B, 5C, and 6, the electronic device may include the display, a foldable housing, and the protection structure.

In an embodiment, a surface of a display 431 may be visually exposed to the outside of an electronic device 401. The display 431, when facing the surface of the display 431, may include a first area 431a, a second area 431b, and a folding area 431c connecting the first area 431a to the second area 431b along the folding axis A. The display 431 may be transformed based on the folding area 431c according to an operating state of the electronic device 401. For example, when the electronic device 401 is in a first state (e.g., the unfolded state of FIG. 4A), the first area 431a and the second area 431b may be substantially on the same plane, and when the electronic device 401 is in a second state (e.g., the folded state of FIG. 2B), the first area 431a and the second area 431b may face each other. In an embodiment, the display 431, when facing a front surface 402A of the electronic device 401, may include a central area D1 and an edge area D2 extending from the central area D1 to an edge of the display. For example, the central area D1 may function as an active area for displaying an image and the edge area D2 may function as a non-active area.

In an embodiment, the display 431 may have a multilayer structure in which a plurality of layers is stacked. In an embodiment, the display 431 may include a display panel 4311, a polarization layer 4312, a window member 4313, a window protection layer 4315, first, second, and third pressure sensitive adhesive (PSA) layers 4314a, 4314b, and 4314c, a metal layer 4317, and a bending protection layer (BPL) 4318. The display panel 4311 may include a flexible display panel and display elements that are coupled to the display panel 4311 and form some pixels. The display panel 4311 may include a touch screen panel (TSP) or the display panel 4311 and the TSP may be formed integrally as one body. The display panel 4311 may include a digitizer layer. The digitizer layer may recognize movement of an external input device (e.g., a pen) as a digital signal. The window member 4313, which may be for example a window layer, may be in a direction of the front surface 402A of the display 431 such that the window member 4313 may protect the surface of the display 431 from the outside of the electronic device 401. The window protection layer 4315 may be stacked on the surface of the window member 4313. In this case, the window protection layer 4315 may not be included in the edge area D2 of the display 431 such that a cover member 491, an example of which is described below, may be attached to the surface of the window member 4313.

The polarization layer 4312, which may be for example a polarization film, may be stacked, to improve the visibility of the display 431, on the surface of the display panel 4311. The polarization layer 4312, by changing the phase of light transmitted through the display 431, may decrease reflection of light incident to the display panel 4311. The polarization layer 4312 may be stacked, for example, between the window member 4313 and the display panel 4311. The first, second, and third PSA layers 4314a, 4314b, and 4314c may be stacked between layers included in the display 431 such that the layers may be attached to one another. For example, the first PSA layer 4314a may be between the display panel 4311 and the polarization layer 4312, the second PSA layer 4314b may be between the polarization layer 4312 and the window member 4313, and the third PSA layer 4314c may be between the window member 4313 and the window protection layer 4315.

A cushion layer 4316 and the metal layer 4317 (e.g., the plate 332 of FIG. 3C) may be on the rear surface of the display panel 4311. The cushion layer 4316 may be formed from a stretchable material and, by absorbing an impact applied to the display panel 4311, may protect the display panel 4311 from an external impact. The metal layer 4317, while improving the impact resistance of the display 431, may function as a heat transfer path through which heat is emitted from the display 431 to the outside of the electronic device 401. However, the layer structure of the display 431 described above is merely an example and embodiments are not limited thereto.

The display 431 may include a bending portion where some of the edge of the display panel 4311 is bent. For example, the display panel 4311, as illustrated in FIG. 5A, may extend from the edge area D2 parallel to the folding axis A until the surface of the display panel 4311 is bent from a direction (e.g., a +Z-axis direction) of the front surface 402A of the foldable housing 402 to a direction (e.g., a −Z-axis direction) of a rear surface 402B of the foldable housing 402. An edge, forming the bending portion, of the display panel 4311 may be bent to a display area of the display 431. The BPL 4318 may be stacked on a surface, forming the bending portion, of the display panel 4311. The BPL 4318 may protect the surface, forming the bending portion, of the display panel 4311 from external force generated by operation of the electronic device 401 or from an external impact.

The electronic device 401, considering a slip of the display 431 caused by a folding operation, may be designed to decrease damage to the display 431. When the display 431 has a multilayer structure, a plurality of layers forming the display 431 may respectively slip while the layers are folded based on the folding axis A. For example, when switching the electronic device 401 from a first state (e.g., the unfolded state of FIG. 2A) to a second state (e.g., the folded state of FIG. 2B), the folding area 431c of a layer adjacent to the front surface 402A of the display 431 may have a relatively greater curvature than that of the folding area 431c of a layer adjacent to the rear surface of the display 431. Accordingly, each layer forming the display 431, while folding the electronic device 401, may slip in a direction (e.g., the X-axis direction of FIG. 4B) perpendicular to the folding axis A. However, the display 431 may not slip in a direction (e.g., the Y-axis direction of FIG. 4B) parallel to the folding axis A.

In an embodiment, a foldable housing 402 may form the exterior of the electronic device 401. The foldable housing 402 may include a first housing 410 and a second housing 420, in which the first housing 410 supports the first area 431a of the display 431 and the second housing 420 supports the second area 431b of the display 431. The first housing 410 and the second housing 420 may be foldably connected to each other through a hinge structure (e.g., the hinge structure 280 of FIG. 2B) and may be folded according to a state of the electronic device 401. Based on the first state, the foldable housing 402 may include the front surface 402A (e.g., a surface in the +Z-axis direction), the rear surface 402B (e.g., a surface in the −Z-axis direction), and a side surface 402C, in which the display 431 is visually exposed to the outside of the electronic device 401 in the front surface 402A, the rear surface 402B is opposite to the front surface 402A, and the side surface 402C encloses an inner space between the front surface 402A and the rear surface 402B. In this case, the front surface 402A of the foldable housing 402 may be open such that the display 431 may be on the front surface 402A of the foldable housing 402.

The foldable housing 402 may include a side surface member 480 forming the side surface 402C. The side surface member 480, as illustrated in FIG. 4A, when facing the front surface 402A of the foldable housing 402 in the first state, may enclose the circumference of the display 431 and form the side surface 402C of the foldable housing 402. The side surface member 480 may include a first side surface member 4801 in the first housing 410 and a second side surface member 4802 in the second housing 420. Based on the first state, as illustrated in FIG. 4A, the first side surface member 4801 may form a first side surface 4021 (e.g., the surface in the +X-axis direction of FIG. 4A) parallel to the folding axis A, a second-first side surface 4022a (e.g., the surface in the +Y-axis direction of the first housing 410 of FIG. 4A) perpendicular to the folding axis A, and a fourth-first side surface 4024a (e.g., the surface in the −X-axis direction of the first housing 410) perpendicular to the folding axis A and opposite to the second-first side surface 4022a. Similarly, based on the first state, as illustrated in FIG. 4A, the second side surface member 4802 may form a second-second side surface 4022b (e.g., the surface in the +Y-axis direction of the second housing 420 of FIG. 4A) perpendicular to the folding axis A, a fourth-second side surface 4024b (e.g., the surface in the −Y-axis direction of the second housing 420 of FIG. 4A) perpendicular to the folding axis A and opposite to the second-second side surface 4022b, and a third side surface 4023 (e.g., the surface in the −X-axis direction of FIG. 4A) parallel to the folding axis A and opposite to the first side surface 4021. In this case, based on the first state, as illustrated in FIG. 4A, the second-first side surface 4022a and the second-second side surface 4022b may be on the same line and may form a second side surface 4022, and the fourth-first side surface 4024a and the fourth-second side surface 4024b may be on the same line and may form a fourth side surface 4024. Accordingly, the side surface 402C of the foldable housing 402 may include the first side surface 4021 and the third side surface 4023 parallel to the folding axis A and the second side surface 4022 and the fourth side surface 4024 perpendicular to the folding axis A. Hereinafter, for convenience of description, unless otherwise described, the side surface member 480 may collectively refer to the first side surface member 4801 and the second side surface member 4802. However, embodiments are not limited thereto.

The side surface member 480, based on a cross-section (e.g., the cross-section of the first side surface 4021 of FIG. 5A or the cross-section of the second side surface 4022 of FIG. 6) perpendicular to the front surface 402A, may include a first support portion 481 and a second support portion 482, in which the first support portion 481 may extend in a direction from the rear surface 402B to the front surface 402A, and the second support portion 482 may extend in a direction from the first support portion 481 to the front surface 402A. The first support portion 481 may form a first inner circumferential surface 4811 (e.g., a surface in the −X-axis direction of FIG. 5A) facing a side surface 3210c and a support surface 4812 facing a direction (e.g., the +Z-axis direction of FIG. 5A) of the front surface 402A. The cover member 491 to be described below may be connected to the support surface 4812. The second support portion 482 may extend in a direction of the front surface 402A from the support surface 4812 and may form a second inner circumferential surface 4821 (e.g., a surface in the −X-axis direction of FIG. 5A) facing the side surface 4310c of the display 431. The first support portion 481 and the second support portion 482 may be spaced apart from the side surface 4310c of the display 431. In this case, the first inner circumferential surface 4811 of the first support portion 481 may be relatively closer to the side surface 4310c of the display 431 than the second inner circumferential surface 4821 of the second support portion 482.

The side surface member 480 may include a recess R facing the side surface 4310c of the display 431. For example, the recess R may be formed with at least some of the inner circumferential surface of the side surface member 480 facing the side surface 4310c of the display 431 concavely formed inward. The recess R may be in at least some of the second inner circumferential surface 4821 of the second support portion 482. In this case, the side surface member 480 may improve the visual aesthetics of the electronic device 401 by securing a slip distance of the protection structure 490, for example the cover member 491, an example of which is described below, based on a folding operation of the display 431, through the recess R and preventing the recess R from being exposed to the outside of the electronic device 401. Although the recess R is illustrated in the second inner circumferential surface 4821 of the side surface member 480 in FIGS. 5A and 6, the foregoing example is merely an example for convenience of description, and embodiments are not limited thereto. For example, the recess R may not be in the second inner circumferential surface 4821 of the side surface member 480. For example, the recess R may only be in the first side surface 4021 and the third side surface 4023 or may be selectively in one of the first, second, third, and fourth side surfaces 4021, 4022, 4023, and 4024. In addition, the recess R may not be in the side surface member 480 at all unlike the examples illustrated in the drawings.

The protection structure 490 may protect the display 431. In an embodiment, the protection structure 490, when facing the front surface 402A of the electronic device 401, by connecting the display 431 to the foldable housing 402, may cover at least some of an inner space between the display 431 and the side surface member 480. For example, the protection structure 490 may cover a space between the display 431 and the side surface member 480 along the circumference of the display 431 such that the space may not be exposed to the outside of the electronic device 401. The protection structure 490 may include the cover member 491, a protection member 492 for covering the surface of the cover member 491 and the surface of the display 431.

The cover member 491 may connect the edge area D2 of the display 431 to the side surface member 480 along the circumference of the display 431. In this case, the cover member 491 may cover the surface of the side surface member 480 and the display 431 facing a direction of the front surface 402A. For example, as illustrated in FIG. 4B, when the electronic device 401 is in the first state, the cover member 491 may cover the inner space between the display 431 and the side surface member 480. The cover member 491 may include a base layer 4911, a first bonding layer 4912 for bonding the base layer 4911 to the protection member 492, and a second bonding layer 4913 for bonding the base layer 4911 to the side surface member 480. The base layer 4911 may be formed from a polymer material (e.g., polymer). The first bonding layer 4912 and/or the second bonding layer 4913 may be formed from a PSA.

Based on the cross-section parallel to the front surface 402A as illustrated in FIG. 5A, the base layer 4911 may extend from the edge area D2 of the display 431 to the side surface member 480. For example, a first edge 491a of the base layer 4911 may be on the surface of the display 431 and a second edge 491b of the base layer 4911 may be on the support surface 4812 of the side surface member 480. For example, the first edge 491a of the base layer 4911 may be attached to the surface of the display 431 and the second edge 491b of the base layer 4911 may be attached to and/or contact with the support surface 4812 of the side surface member 480. In this case, because the protection member 492 covers the surface of the cover member 491, the first edge 491a of the base layer 4911 on the surface of the display 431 may be between the display 431 and the protection member 492, and the second edge 491b of the base layer 4911 on the support surface 4812 of the side surface member 480 may be between the protection member 492 and the side surface member 480. The first edge 491a of the base layer 4911 may be on the surface of the window member 4313 in the edge area D2 of the display 431. In this case, because the surface of the window member 4313 corresponding to the edge area D2 does not include the window protection layer 4315, the base layer 4911 may be attached to the window member 4313 through the third PSA layer 4314c applied to the surface of the window member 4313. The base layer 4911 may include a first base surface facing a direction (e.g., the +Z-axis direction) of the front surface 402A and a second base surface facing a direction (e.g., the −Z-axis direction) opposite to the first base surface.

The base layer 4911 may be between the BPL 4318 (or a bending portion in a chip-on-plastic (COP) structure) and the protection member 492 such that the BPL 4318 may not be visually exposed to the outside of the electronic device 401.

The thickness of the base layer 4911 may be greater than the thickness of the window member 4313. For example, the base layer 4911 may have a high intensity (e.g., a tensile intensity), compared to the window member 4313. For example, by having a high intensity compared to the window member 4313, the base layer 4911 may function as a bridge between the support surface 4812 of the side surface member 480 and the window member 4313.

The first bonding layer 4912 may be stacked on a first base surface 4911A of the base layer 4911 and may attach the base layer 4911 to the protection member 492. The second bonding layer 4913 may be stacked on a second base surface 4911B of the base layer 4911 and may attach the base layer 4911 to the side surface member 480. For example, the second bonding layer 4913 may be between the second edge 491b of the base layer 4911 and the support surface 4812 of the first support portion 481. The first bonding layer 4912 and the second bonding layer 4913 may be formed from a sufficiently adhesive material such that the first and second bonding layers 4912 and 4913 may respectively attach the base layer 4911 to the display 431 and the side surface member 480. Accordingly, the cover member 491 may be bonded to the display 431 and the side surface member 480 respectively through the first and second bonding layers 4912 and 4913. The second bonding layer 4913 may be formed from a heat responsive foam material. In this case, during the maintenance of the electronic device 401, by applying heat to the second bonding layer 4913, the display 431 may be easily detached from the side surface member 480. When the electronic device 401 is folded, the base layer 4911 of the display 431 may slip on the side surface member 480. The second bonding layer 4913 may be formed from a PSA. For example, the second bonding layer 4913 may maintain a semi-solid form. The adhesion of the first bonding layer 4912 may be greater than that of the second bonding layer 4913.

The protection member 492 may be attached to the display 431 and may protect the surface of the display 431. The protection member 492 may have a greater area compared to the display 431 such that the protection member 492 may cover the entire surface of the display 431. When facing the front surface 402A of the electronic device 401, as illustrated in FIG. 4B, the protection member 492 may be on the surface of the cover member 491 and the surface of the display 431 such that the protection member 492 may cover the surfaces of the cover member 491 and the display 431 facing the front surface 402A of the electronic device 401 at the same time. The protection member 492, when facing the front surface 402A of the electronic device 401, may include a first protection area P1 and a second protection area P2, in which the first protection area P1 is connected to and overlaps the active area D1, and the second protection area P2 is spaced apart from the first protection area P1 at a first interval a1 and extends to the edge of the protection member 492. In this case, the first protection area P1 may be on the surface of the display 431 such that the first protection area P1 may cover the active area D1 of the display 431, and the second protection area P2 may be on the cover member 491 such that the second protection area P2 may cover the surface of the cover member 491. Referring to FIG. 5B, a print layer 4922 for identifying a view area of the display 431 may be on the surface of the second protection area P2 of the protection member 492. The print layer 4922, by preventing the rest of the area of the display 431 except for the view area from being visually exposed to the outside of the electronic device 401, may identify the view area of the display 431. The cover member 491 may be attached to the edge area D2 of the display 431, and accordingly, the view area of the display 431 may be identified by forming the print layer 4922 on the surface of the second protection area P2 of the protection member 492.

Based on the cross-section illustrated in FIG. 5B, the second protection area P2 may be spaced apart from the first protection area P1 at the first interval a1. In this case, the first protection area P1 may overlap the central area D1 functioning as an active area of the display 431, and accordingly, the print layer 4922 may be spaced apart from the central area D1 at the first interval a1. The edge area D2 of the display 431 may not include the window protection layer 4315. In this case, the window protection layer 4315 may be excluded from an area overlapping the second protection area P2 such that an edge of the display 431 may be visually covered by the print layer 4922. For example, the window protection layer 4315, as illustrated in FIG. 5B, may be excluded from an area overlapping the second protection area P2 at a second interval a2. The cover member 491 may be connected to the surface, on which the window protection layer 4315 is excluded, of the window member 4313. In this case, the cover member 491, considering assembly tolerance and a slip of the display 431, may be spaced apart from a side surface 4315c of the window protection layer 4315 at a third interval a3. Therefore, a spacing distance (e.g., the first, second, and third intervals a1+a2+a3) from the central area D1 to the cover member 491 may be greater than a spacing distance (e.g., the first interval a1) between the first protection area P1 of the protection member 492 and the second protection area P2 of the protection member 492. In addition, when the display 431 includes a bending portion, as illustrated in FIG. 5B, the BPL 4318 may be attached to the surface of the display panel 4311 forming the bending portion. The BPL 4318, considering assembly tolerance and a slip of the display 431, as illustrated in FIG. 5B, may be spaced apart from the window protection layer 4315 and the polarization layer 4312 at a fifth interval a5 and may be connected to the surface of the display panel 4311. The edges of the window protection layer 4315, the polarization layer 4312, and the first, second, and third PSA layers 4314a, 4314b, and 4314c may substantially have the same cross-section such that there is no vulnerable portion in terms of rigidity. In this structure, the cover member 491, based on the cross-section illustrated in FIG. 5B, may be spaced apart from the window protection layer 4315 at the third interval a3 and may be attached to the surface of the window member 4313 spaced apart from the BPL 4318 at the fifth interval a5. For example, the cover member 491 may have a fourth interval a4, which is a minimum attachment width, on the surface of the display 431 considering the arrangement and tolerance distance of each base included by the display 431, for example, the window protection layer 4315, the window member 4313, and the bending protection layer 4318, and the position of the print layer 4922 for displaying the view area.

Referring to FIG. 5C, a protection structure 490' may include a cover member 491' and the protection member 492 for covering the surface of the cover member 491' and the surface of the display 431. The cover member 491' may be between the display 431 and the protection member 492. For example, the cover member 491' may include a first bonding layer 4912' between a base layer 4911' and the protection member 492, and a second bonding layer 4913' between the base layer 4911' and the side surface member 480. The first bonding layer 4912' may be stacked on the rear surface of the protection member 492 such that the first bonding layer 4912' may extend from the second protection area P2 of the protection member 492 to the first protection area P1 of the protection member 492. For example, the first bonding layer 4912', based on the cross-section illustrated in FIG. 5C, may expand from the first base surface 4911A to the first protection area P1. In this case, the first bonding layer 4912' on the rear surface of the first protection area P1 of the protection member 492 may be between the window protection layer 4315 of the display 431 and the protection member 492.

In an embodiment, the side surface member 480, considering a slip caused by a folding operation of the display 431, may be spaced apart from the side surface 4310c of the display 431. For example, the first inner circumferential surface 4811 of the first side surface member 4801 facing the side surface 4310c of the display 431 parallel to the folding axis A may be spaced apart from the side surface 4310c of the display 431 at a third distance d3. In this case, the third distance d3 may be greater than or equal to a slip distance of the display 431. Because the cover member 491 is connected to the display 431, the cover member 491 may slip by the slip distance of the display 431 in a direction (e.g., the X-axis direction) perpendicular to the folding axis A according to a folding operation of the display 431. The side surface member 480, considering a slip of the cover member 491 perpendicular to the folding axis A, may be spaced apart from a side surface 491c of the cover member 491. For example, as illustrated in FIG. 5B, the second inner circumferential surface 4821 of the first side surface member 4801 facing the side surface 491c of the cover member 491 parallel to the folding axis A may be spaced apart from the side surface 491c of the cover member 491 at a first distance d1. In this case, the first distance d1 is greater than or equal to the slip distance of the display 431.

In an embodiment, as illustrated in FIG. 6, which is the cross-section of the electronic device 401 along the VI-VI line of FIG. 4A, the second inner circumferential surface 4821' of the side surface member 480 forming the second side surface 4022 (or the fourth side surface 4024) of the cover member 491 perpendicular to the folding axis A may be spaced apart from a side surface 491c' at a second distance d2 that is less than a first distance (e.g., the first distance d1 of FIG. 5A). In an embodiment, the display 431 may not slip in a direction parallel to the folding axis A. In this case, a second inner circumferential surface 4821' of the side surface member 480 forming the second side surface (or the fourth side surface 4024), considering assembly tolerance, may be spaced apart from the side surface 491c' of the cover member 491 facing the second inner circumferential surface 4821' at a minimum distance. For example, the second distance d2 may be about 0.1 mm to about 3.0 mm.

In an embodiment, the protection structure 490 may cover a space between the display 431 and the side surface member 480, and thus, a separate member (e.g., a decoration and/or a bezel) for covering the edge area D2 of the display 431 may not be needed. Accordingly, an area of the side surface member 480, to which the separate member, such as the decoration, had been connected, may be used in various ways. For example, as illustrated in FIG. 6, the side surface member 480 may include a speaker hole, a camera hole, or a through hole 4804, in which the through hole 4804 may be used as a seating groove for a damper. Although the through hole 4804 is illustrated in the second side surface member 4802 in the drawings for convenience of description, a portion, for accommodating the through hole 4804, of the side surface member 480 is not limited to the foregoing example, and the through hole 4804 may be in the first side surface member 4801, however embodiments are not limited thereto.

Figure 7:
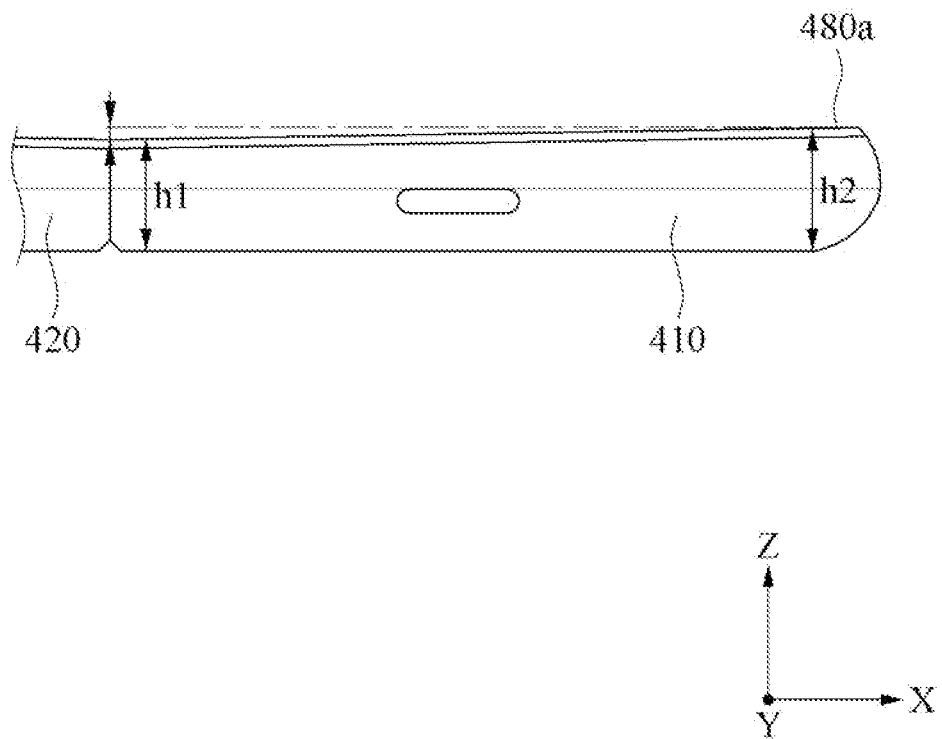
FIG. 7 is a side view illustrating an electronic device in a direction parallel to a folding axis in a first state of the electronic device according to an embodiment.

FIG. 7 is a side view illustrating an electronic device in a direction parallel to a folding axis in a first state of the electronic device according to one embodiment.

Referring to FIG. 7, the foldable housing 402 may have the side surface member 480a of which the thickness decreases in a direction towards the folding axis A. For example, the thickness of the foldable housing 402 may decrease from an outer side to the folding axis A in a direction (e.g., the X-axis direction) perpendicular to the folding axis A. As another example, when facing the foldable housing 402 in a direction parallel to the folding axis A, a second height h2, facing a direction (e.g., +Z-axis direction) of the front surface 402A of the foldable housing 402 of the side surface member 480a may be greater than a first height h1, in which the folding axis A is, of the side surface member 480a. In this case, the side surface member 480a may have an inclined upper end surface such that the height of the side surface member 480a may be inclined downward from the second height h2 to the first height h1 from the outer side to the folding axis A. For example, since the thickness, in which the folding axis A is, of the foldable housing 402 is relatively less than that of a boundary area, in a second state (e.g., the folded state of FIG. 2B) of the electronic device 401, the first housing 410 and the second housing 420 may not be spaced apart from each other by a gap formed when a folding area (e.g., the folding area 431c of FIG. 4A) of the display 431 is bent.

Figure 8A:
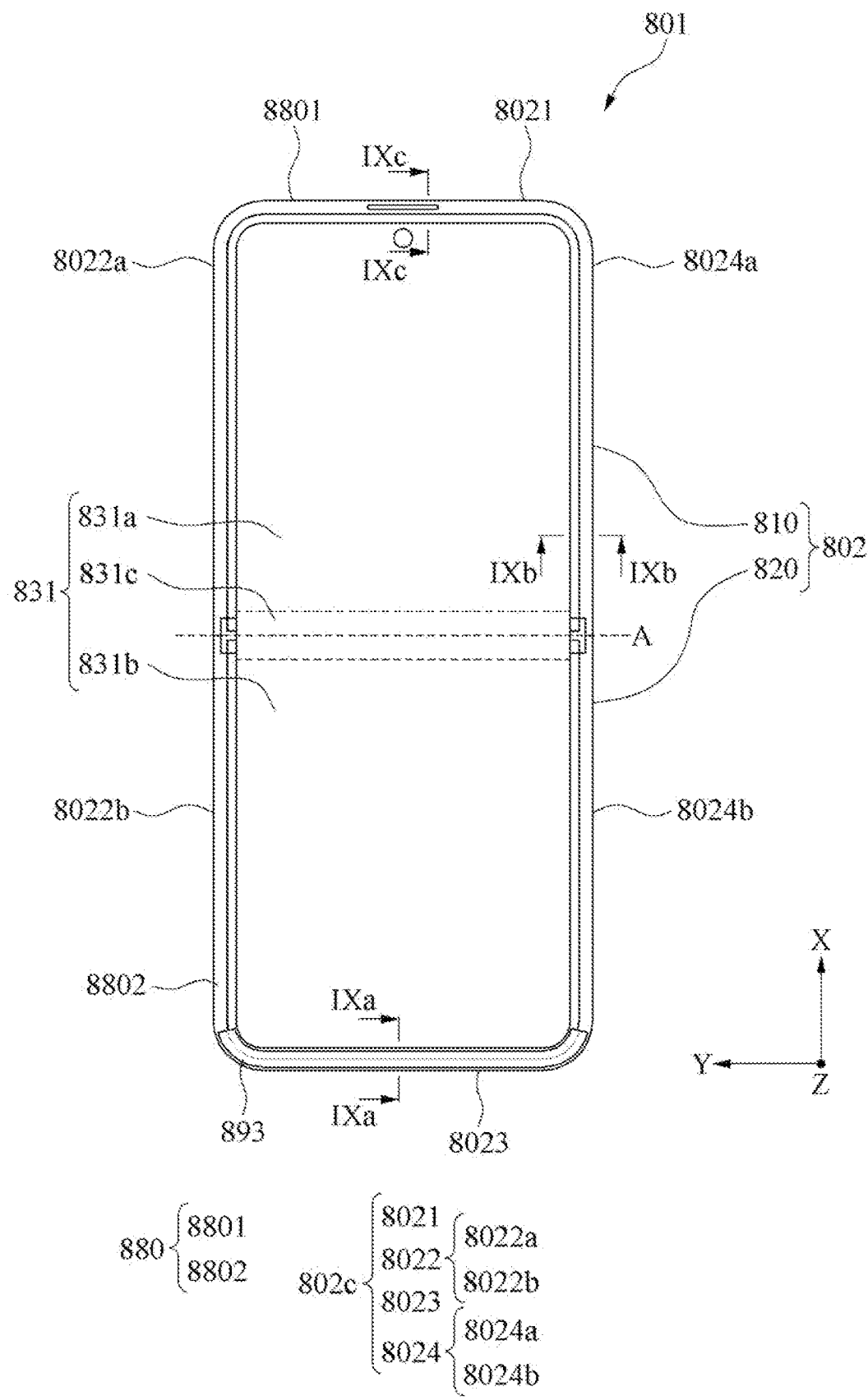
FIG. 8A is another plan view illustrating a display in a first state of an electronic device according to an embodiment.
Figure 8B:
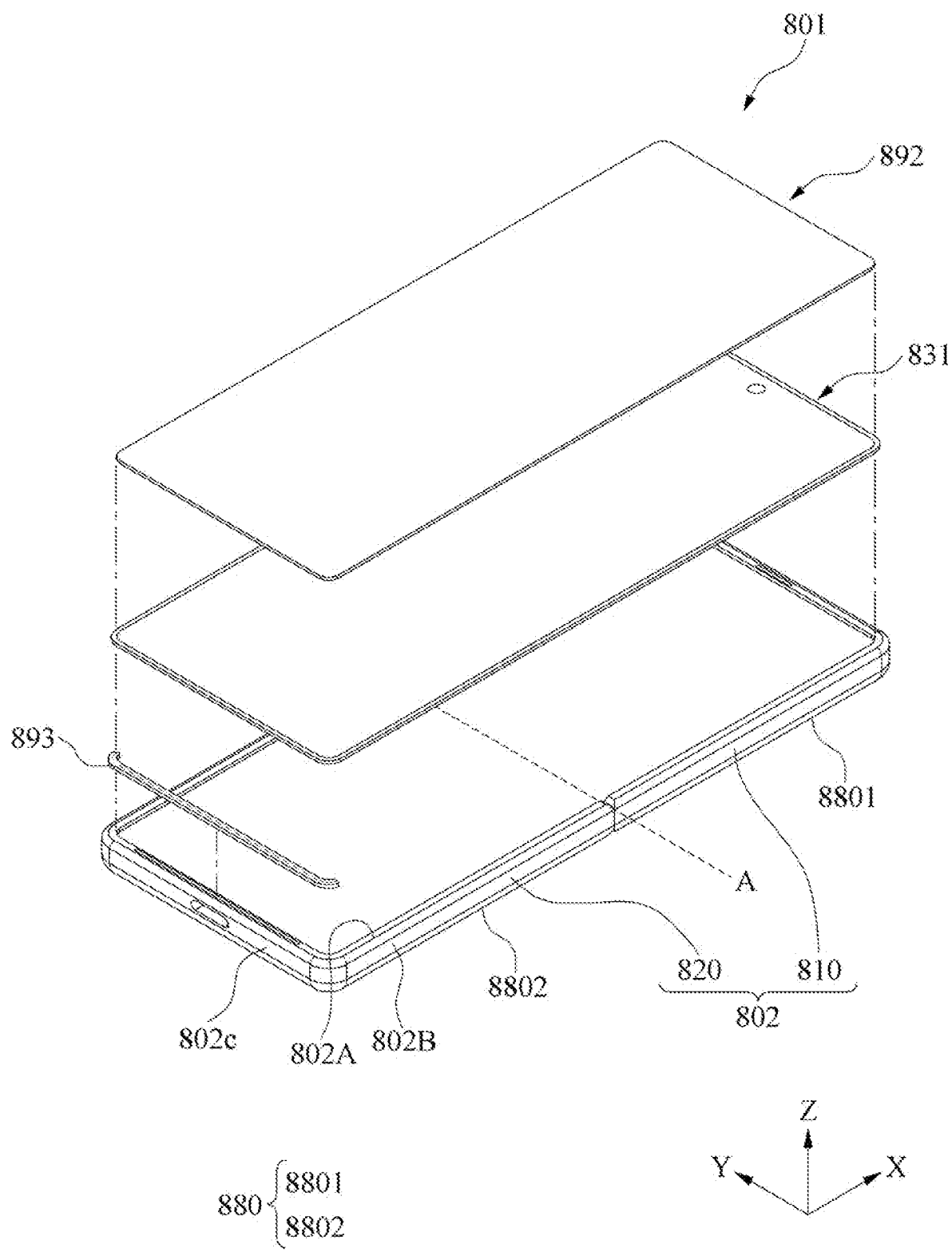
FIG. 8B is an exploded perspective view illustrating a connection between the display and a housing in a first state of the electronic device according to an embodiment.
Figure 9A:
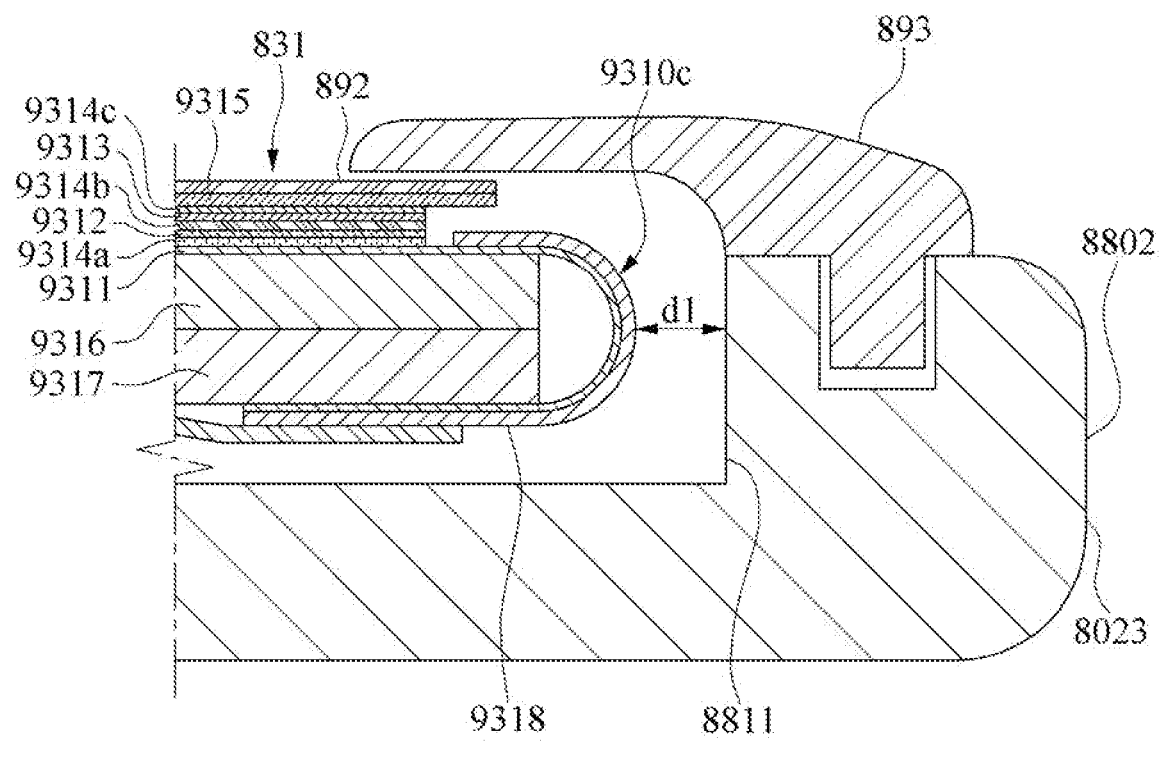
FIG. 9A is a cross-sectional view illustrating the electronic device along an IXa-IXa line of FIG. 8A according to an embodiment.
Figure 9B:
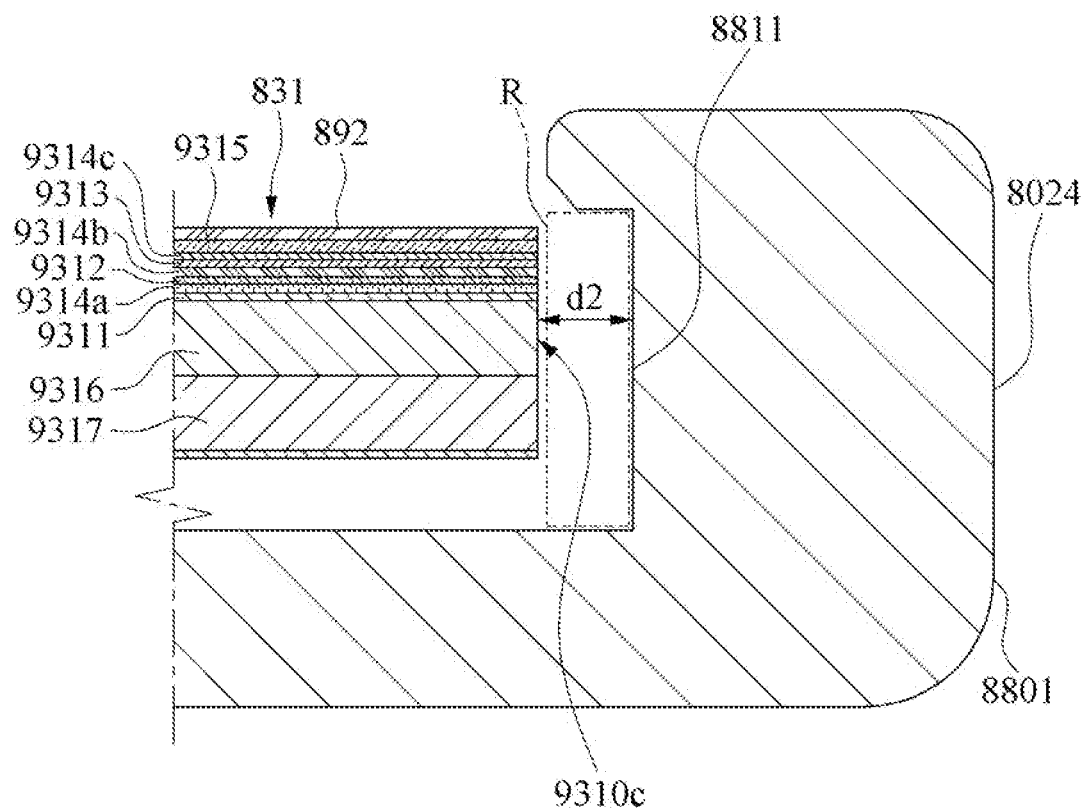
FIG. 9B is a cross-sectional view illustrating the electronic device along an IXb-IXb line of FIG. 8A according to an embodiment.
Figure 9C:
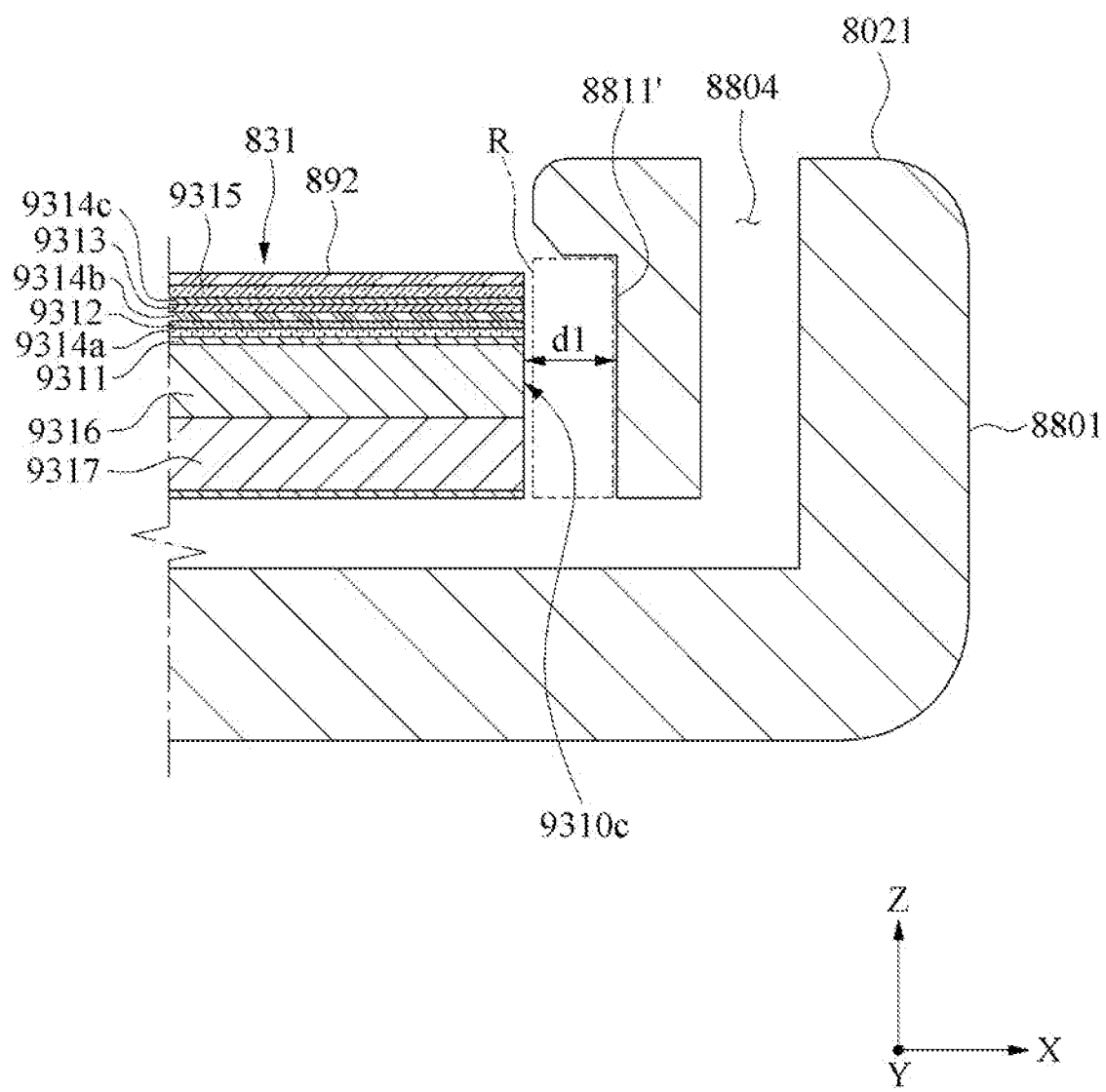
FIG. 9C is a cross-sectional view illustrating the electronic device along an IXc-IXc line of FIG. 8A according to an embodiment.

FIG. 8A is another plan view illustrating a display in a first state of an electronic device according to one embodiment, FIG. 8B is an exploded perspective view illustrating a connection between a display and a housing in a first state of the electronic device according to one embodiment, FIG. 9A is a cross-sectional view illustrating the electronic device along an IXa-IXa line of FIG. 8A, FIG. 9B is a cross-sectional view illustrating the electronic device along an IXb-IXb line of FIG. 8A, and FIG. 9C is a cross-sectional view illustrating the electronic device along an IXc-IXc line of FIG. 8A.

Referring to FIGS. 8A, 8B, 9A, 9B and 9C, an electronic device 801 (e.g., the electronic device 101 of FIG. 1, the electronic device 201 of FIG. 2A, or the electronic device 301 of FIG. 3A) may include a display 831, a foldable housing 802, and a protection structure.

In an embodiment, the surface of the display 831 may be visually exposed to the outside of the electronic device 801. The display 831 may include a first area 831a, a second area 831b, and a folding area 831c connecting the first area 831a to the second area 831b in the folding axis A. The state of the display 831, according to an operating state of the electronic device 801, may be switched between a first state (e.g., the unfolded state of FIG. 2A) and a second state (e.g., the folded state of FIG. 2B), in which the first area 831a and the second area 831b may be on substantially the same plane in the first state, and the first area 831a and the second area 831b may face each other in the second state.

In an embodiment, the display 831 may have a multilayer structure in which a plurality of layers is stacked. The display 831 may include a display panel 9311, a window member 9313, a window protection layer 9315, a polarization layer 9312, a cushion layer 9316, and a metal layer 9317, in which the window member 9313 is attached to the surface of the display panel 9311, the window protection layer 9315 is stacked on the surface of the window member 9313, the polarization layer 9312 is stacked between the window member 9313 and the display panel 9311, and the cushion layer 9316 may be on the rear surface of the display panel 9311. First, second, and third PSA layers 9314a, 9314b, and 9314c for attaching layers to one another may be stacked between the display panel 9311, the polarization layer 9312, and the window member 9313. The display 831, as illustrated in FIG. 9A, may include a bending portion in which some of both edges, parallel to the folding axis A, of the display 831 are bent. For example, an edge, forming the bending portion, of the display panel 9311 may be bent and extend in a direction from a front surface 802A to a rear surface 802B of foldable housing 802. In this case, a bending protection layer 9318 may be attached to the surface, forming the bending portion, of the display panel 9311. In an embodiment, a protection member 892 may be attached to the surface of the display 831.

The foldable housing 802 may form the exterior of the electronic device 801. The foldable housing 802 may include a first housing 810 for supporting the first area 831a and a second housing 820 for supporting the second area 831b. The first housing 810 and the second housing 820 may be foldably connected to each other through a hinge structure (e.g., the hinge structure 280 of FIG. 2B) and may perform a folding operation such that the first area 831a of the display 831 and the second area 831b of the display 831 may switch between the first state and the second state. The foldable housing 802, based on the first state, as illustrated in FIG. 8B, may include the front surface 802A, the rear surface 802B, and a side surface 802c, in which the display 831 is visually exposed to the outside of the electronic device 801 on the front surface 802A (e.g., a surface facing the +Z axis), the rear surface 802B is opposite to the front surface 802A, and the side surface 802c surrounds an inner space between the front surface 802A and the rear surface 802B.

The foldable housing 802 may form the side surface 802c through a side surface member 880. The side surface member 880 may surround at least some of the circumference of the display 831 and may form the side surface 802c of the foldable housing 802. The side surface member 880 may include a first side surface member 8801 in the first housing 810 and a second side surface member 8802 in the second housing 820. Based on the first state, as illustrated in FIG. 8A, the first side surface member 8801 may form a first side surface 8021 that is parallel to the folding axis A and a second-first side surface 8022a and a fourth-first side surface 8024a that are perpendicular to the folding axis A and face opposite directions to each other, and the second side surface member 8802 may form a third side surface 8023 that is parallel to the folding axis A and a second-second side surface 8022b and a fourth-second side surface 8024b that are perpendicular to the folding axis A and face opposite directions to each other. In this case, based on the first state, the second-first side surface 8022a and the second-second side surface 8022b may be on the same line and may form a second side surface 8022, and the fourth-first side surface 8024a and the 4fourth-second side surface 8024b may be on the same line and may form a fourth side surface 8024. Accordingly, the foldable housing 802 may include the first side surface 8021 (e.g., a surface facing the +X-axis direction of FIG. 8A) and the third side surface 8023 (e.g., a surface facing the −X-axis direction of FIG. 8A) that are parallel to the folding axis A and opposite to each other and the second side surface 8022 (e.g., a surface facing the +Y-axis direction of FIG. 8A) and the fourth side surface 8024 (e.g., a surface facing the −Y-axis direction of FIG. 8A) that are perpendicular to the folding axis A and opposite to each other. However, embodiments are not limited thereto.

In an embodiment, to decrease damage caused by contact between the side surface member 880 and the display 831, an inner circumferential surface 8811, facing a side surface 9310c of the display 831, of the side surface member 880 may be spaced apart from the side surface 9310c of the display 831. In this case, a spacing distance between the side surface member 880 and the display 831 may vary at each position considering a slip distance according to a folding operation of the display 831. For example, as illustrated in FIG. 9C, the first side surface 8021 (or the third side surface 8023 of FIG. 9A) parallel to the folding axis A may be spaced apart from the side surface 9310c, facing the first side surface 8021, of the display 831 at a first distance d1 that is greater than or equal to the slip distance. As illustrated in FIG. 9B, the fourth side surface 8024 (or the second side surface 8022) perpendicular to the folding axis A may be spaced apart from the side surface 9310c, facing the fourth side surface 8024, of the display 831 at a second distance d2 that is less than the first distance d1. In this case, the second distance d2, considering assembly tolerance, may be a distance, for example, in a range from about 0.1 mm to about 0.3 mm.

In an embodiment, a recess R may be formed concavely inward in at least some of the side surface member 880. The side surface member 880, through the recess R, may secure the slip distance according to a folding operation of the display 831 and may prevent a space formed through the recess R from being visually exposed to the outside of the electronic device 801. The side surface member 880, through the recess R, may secure a spacing distance from the side surface 9310c, facing the side surface member 880, of the display 831. For example, as illustrated in FIG. 9B, the inner circumferential surface 8811 of the fourth side surface 8024 perpendicular to the folding axis A may be spaced apart, through the recess R, from the side surface 9310c of the display 831 at the second distance d2, and as illustrated in FIG. 9C, the inner circumferential surface 8811' of the first side surface 8021 parallel to the folding axis A may be spaced apart, through the recess R, from the side surface 9310c of the display 831 at the first distance d1. In an embodiment, a protection structure 490 may cover at least some of a space between the side surface 802c of the foldable housing 802 and the display 831. The protection structure may include one or more bezel members 893 in the side surface member 880 and extending to an active area of the display 831. The bezel members 893 may cover the edge of the display 831 such that a space between the first side surface member 8801 and the display 831 may not be exposed to the outside of the electronic device 801. A portion, to which the bezel members 893 are connected, of the side surface 802c, for example, a portion, forming the third side surface 8023, of the side surface member 880, as illustrated in FIG. 9A, may not include the recess R. For example, the bezel members 893 may cover a space between the first side surface member 8801, to which the bezel members 893 are connected, and the display 831, and thus, a recess R may not be included. A portion, to which the bezel members 893 are not connected, of the side surface member 880 may include a speaker hole, a camera hole, or a through hole 8804, as illustrated in FIG. 9C, in which the through hole 8804 may be used as a seating groove for a damper.

In this structure, the bezel members 893 and the recess R may cover a space between the display 831 and the side surface member 880, and accordingly, a user's hand may less likely be caught in the space between the display 831 and the side surface member 880 while using the electronic device 801. In addition, the side surface 802c of the display 831 may not be visually exposed to the outside of the electronic device 801, and accordingly, the aesthetics of the electronic device 801 may be improved.

According to embodiments, an electronic device 401 includes a display 431 including a first area 431a and a second area 431b, a foldable housing 402 including a first housing 410 for supporting the first area 431a and a second housing 420 for supporting the second area 431b, a hinge structure connecting the first housing 410 to the second housing 420 to be foldable on a folding axis A in a first state and a second state, in which the first area 431a and the second area 431b are substantially on a same plane in the first state and face each other in the second state, and a protection structure 490, at least some of which is in the foldable housing 402, in which the foldable housing 402, in the first state, includes a front surface 402A including the display 431, a rear surface 402B opposite to the front surface 402A, and a side surface 402C enclosing an inner space between the front surface 402A and the rear surface 402B, and the protection structure 490, from a perspective facing the front surface 402A of the electronic device 401 in the first state, covers at least some of a space between the display 431 and the side surface 402C of the foldable housing 402.

The protection structure 490 may include a cover member 491 connecting an edge of the display 431 and the side surface 402C of the foldable housing 402 along a circumference of the display 431, and a protection member 492 attached to the display 431, in which, from the perspective facing the front surface 402A of the foldable housing 402, the protection member 492 covers a surface of the display 431 and the cover member 491 facing the front surface 402A.

The cover member 491, in the cross-section parallel to the front surface 402A, may include a base layer 4911, in which a first edge is between the display 431 and the protection member 492 and a second edge is between the protection member 492 and the side surface 402C, a first bonding layer 4912 stacked on a first base surface 4911A of the base layer 4911 facing the protection member 492 and bonding the base layer 4911 to the protection member 492, and a second bonding layer 4913 stacked on a second base surface 491B opposite to the first base surface 4911A and bonding the base layer 4911 to the side surface 402C of the foldable housing 402.

A thickness t2 of the second bonding layer 4913 may be greater than a thickness t1 of the first bonding layer 4912.

The second bonding layer 4913 may include a heat responsive foam material.

From the perspective facing the front surface 402A of the electronic device 401, the display 431 may include a central area D1 functioning as an active area and an edge area D2 extending to an edge of the display 431 from the central area D1, and the cover member 491 is connected to the edge area D2.

The display 431 may include a window member 4313 facing the front surface 402A of the foldable housing 402 and a window protection layer 4315 covering the surface of the window member 4313, in which the window protection layer 4315 is not included in the edge area D2 of the display 431, and the cover member 491 is connected to the surface of the window member 4313.

The protection member 492 may include, from the perspective facing the front surface 402A of the electronic device 401, a first protection area P1 overlapping a central area D1 functioning as an active area of the display 431, and a second protection area P2 spaced apart at a predetermined distance from the first protection area P1 and extending to the edge of the display 431, in which a print layer 4922 for identifying a view area of the display 431 is disposed on the surface of the second protection area P2.

The foldable housing may include, in the first state, a side surface member 480 between the front surface 402A and the rear surface 402B and forming the side surface 402C along the circumference of the display 431, and the side surface member 480, in the cross-section perpendicular to the front surface 402A, may include a first support portion 481 forming a support surface 4812 facing the front surface 402A and including the cover member 491 and a first inner circumferential surface 4811 facing the side surface 402C of the display 431, and a second support portion 482 forming a second inner circumferential surface 4821 facing the side surface 402C of the display 431 and extending from the first support portion 481 in a direction of the front surface 402A.

In the cross-section perpendicular to the front surface 402A, the first inner circumferential surface 4811 may be closer to the side surface 402C of the display 431 than the second inner circumferential surface 4821.

At least some of the side surface member 480 may include a recess R having a concave surface facing the side surface 402C of the display 431, and the recess R may be formed on the second inner circumferential surface 4821.

In the first state, the side surface 402C of the foldable housing 402 may include a first side surface 4021 parallel to the folding axis A, a second side surface 4022 perpendicular to the folding axis A, a third side surface 4023 parallel to the folding axis A and opposite to the first side surface 4021, and a fourth side surface 4024 perpendicular to the folding axis A and opposite to the second side surface 4022, in which a portion second inner circumferential surface 4821 of the side surface member 480, forming the first side surface 4021 and the third side surface 4023 is spaced apart, at a first distance d1 that is greater than or equal to a slip distance of the display 431, from the side surface 402C of the cover member 491.

A portion of second inner circumferential surface 4821 of the side surface member 480, forming the second side surface 4022 and the fourth side surface 4024 may be spaced apart, at a second distance d2 that is less than the first distance d1, from the side surface 402C of the cover member 491.

From the perspective facing the foldable housing 402 in a direction parallel to the folding axis A, a height of the side surface 402C may be inclined downward toward the folding axis A from both edges of the foldable housing which are parallel to the folding axis.

The side surface 802C of the foldable housing 802 may include a first side surface 8021 parallel to the folding axis A, a second side surface 8022 perpendicular to the folding axis A, a third side surface 8023 parallel to the folding axis A and opposite to the first side surface 8021, and a fourth side surface 8024 perpendicular to the folding axis A and opposite to the second side surface 8022, in which the protection structure 490 may include bezel members 893 on at least one of the first side surface 8021 and the third side surface 8023 and of which an edge extends to a display area of the display 831.

According to embodiments, a display 431 including a protection structure 490 includes a display 431 disposed on a front surface 402A of a foldable housing 402 folding on a folding axis A, a cover member 491 disposed on a surface of the display 431 along a circumference of an edge of the display 431, and a protection member 492 attached to the display 431 for covering a surface of the cover member 491 and the display 431, in which the cover member 491, in a cross-section perpendicular to the front surface 402A, includes a base layer 4911, in which a first edge 491A is between the display 431 and the protection member 492, and a second edge 492B is between the display 431 and the foldable housing 402, a first bonding layer 4912 stacked on a first base surface 4911A of the base layer 4911 facing the protection member 492 and bonding the base layer 4911 to the protection member 492, and a second bonding layer 4913 stacked on at least some of a second base surface 4911B opposite to the first base surface 4911A and bonding the base layer 4911 and the foldable housing 402.

The first bonding layer 4912 may have a first thickness t1 and the second bonding layer 4913 may have a second thickness t2 that is greater than the first thickness t1.

From the perspective facing the front surface 402A of the electronic device 401, the display 431 may include a central area D1 functioning as an active area and an edge area D2 extending to an edge of the display from the central area D1, and the cover member 491 may be connected to the edge area D2.

The protection member 492 may include, from the perspective facing the front surface 402A of the electronic device 401, a first protection area P1 overlapping an active area of the display 431 and a second protection area P2 spaced apart at a predetermined distance from the first protection area P1 and extending to the edge of the protection member 492, in which a print layer 4922 is disposed on the surface of the second protection area P2.

According to embodiments, an electronic device 401 includes a display 431 including a first area 431a and a second area 431b, a foldable housing 402 including a first housing 410 for supporting the first area 431a, a second housing 420 for supporting the second area 431b, and a side surface member 480 enclosing a space between a front surface 402A on which the display 431 is visually exposed to the outside of the electronic device 401 and a rear surface 402B opposite to the front surface 402A, a hinge structure connecting the first housing 410 to the second housing 420 to be foldable on a folding axis A and including a first state and a second state, in which the first area 431a and the second area 431b are substantially on the same plane in the first state and face each other in the second state, a protection member 492 covering a surface of the display 431, and a cover member 491 connecting an edge of the display 431 to the side surface member 480 along a circumference of the display 431 and of which a surface facing the front surface 402A is covered by the protection member 492, in which, from the perspective facing the front surface 402A of the electronic device 401, a portion, of the cover member 491, connected to the display 431 is disposed between the display 431 and the protection member 492.

What is claimed is:

1. An electronic device comprising:
    a display comprising a first area and a second area;
    a foldable housing comprising a first housing which supports the first area and a second housing which supports the second area;
    a hinge structure which connects the first housing and the second housing to be foldable relative to each other on a folding axis between a first state in which the first area and the second area are substantially coplanar, and a second state in which the first area and the second area face each other; and
    a protection structure provided on the display, wherein at least a portion of the protection structure is included in the foldable housing,
    wherein the foldable housing further comprises a front surface including the display, a rear surface opposite to the front surface, and a side surface which encloses an inner space between the front surface and the rear surface, and
    wherein the protection structure, from a perspective facing the front surface of the foldable housing in the first state, covers at least some of a space between the display and the side surface of the foldable housing.

2. The electronic device of claim 1, wherein the protection structure comprises:
    a cover member which connects an edge of the display to the side surface of the foldable housing along a circumference of the display, and
    a protection member attached to the display, and
    wherein, from the perspective facing the front surface of the electronic device, the protection member covers a surface of the display and the cover member facing the front surface of the foldable housing.

3. The electronic device of claim 2, wherein the cover member comprises:
    a base layer having a first edge between the display and the protection member, and a second edge between the protection member and the side surface of the foldable housing;
    a first bonding layer stacked on a first base surface of the base layer facing the protection member, and which bonds the base layer to the protection member; and
    a second bonding layer stacked on a second base surface opposite to the first base surface, and which bonds the base layer to the side surface of the foldable housing.

4. The electronic device of claim 3, wherein a thickness of the second bonding layer is greater than a thickness of the first bonding layer.

5. The electronic device of claim 3, wherein the second bonding layer comprises a heat responsive foam material.

6. The electronic device of claim 2, wherein the display further comprises a central area which functions as an active area, and an edge area which extends to the edge of the display from the central area, and
    wherein the cover member is connected to the edge area of the display.

7. The electronic device of claim 6, wherein the display further comprises a window member facing the front surface of the foldable housing, and a window protection layer covering a surface of the window member,
    wherein the window protection layer is not included in the edge area of the display, and
    wherein the cover member is connected to the surface of the window member.

8. The electronic device of claim 2, wherein the protection member further comprises:
    a first protection area overlapping a central area functioning as an active area of the display, and
    a second protection area which is spaced apart from the first protection area at a predetermined distance, and which extends to the edge of the display, and
    wherein a print layer identifying a view area of the display is provided on a surface of the second protection area.

9. The electronic device of claim 2, wherein the foldable housing further comprises a side surface member disposed between the front surface and the rear surface of the foldable housing, and forming the side surface of the foldable housing along the circumference of the display, and
    wherein the side surface member comprises:
        a first support portion which forms a support surface facing the front surface of the foldable housing and which includes the cover member and a first inner circumferential surface facing the side surface of the display, and
        a second support portion which forms a second inner circumferential surface facing the side surface of the display, and which extends from the first support portion in a direction of the front surface of the foldable housing.

10. The electronic device of claim 9, wherein, in a cross-section perpendicular to the front surface of the foldable housing, the first inner circumferential surface is closer to the side surface of the display than the second inner circumferential surface.

11. The electronic device of claim 9, wherein the side surface member comprises a recess having a concave surface facing the side surface of the display, and
    wherein the recess is formed in the second inner circumferential surface.

12. The electronic device of claim 10, wherein the side surface of the foldable housing comprises:
    a first side surface parallel to the folding axis;
    a second side surface perpendicular to the folding axis;
    a third side surface parallel to the folding axis and opposite to the first side surface; and
    a fourth side surface perpendicular to the folding axis and opposite to the second side surface, and
    wherein a portion of the second inner circumferential surface of the side surface member which forms the first side surface and the third side surface is spaced apart, at a first distance that is greater than or equal to a slip distance of the display, from a side surface of the cover member.

13. The electronic device of claim 12, wherein a portion of the second inner circumferential surface of the side surface member which forms the second side surface and the fourth side surface is spaced apart, at a second distance that is less than the first distance, from the side surface of the cover member.

14. The electronic device of claim 1, wherein, from a perspective facing the foldable housing in a direction parallel to the folding axis, a height of the side surface of the foldable housing is inclined downward toward the folding axis from both edges of the foldable housing which are parallel to the folding axis.

15. The electronic device of claim 1, wherein the side surface of the foldable housing comprises:
a first side surface parallel to the folding axis;
a second side surface perpendicular to the folding axis;
a third side surface parallel to the folding axis and opposite to the first side surface; and
a fourth side surface perpendicular to the folding axis and opposite to the second side surface,
wherein the protection structure comprises a bezel member on at least one of the first side surface and the third side surface, and
wherein an edge of the bezel member extends to a display area of the display.

16. A display comprising:
a display provided on a front side of a foldable housing which is foldable on a folding axis;
a cover member provided on a surface of the display along a circumference of an edge of the display; and
a protection member attached to the display and which covers a surface of the cover member and the display,
wherein the cover member comprises:
a base layer having a first edge between the display and the protection member and a second edge between the display and the foldable housing;
a first bonding layer which is stacked on a first base surface of the base layer facing the protection member, and bonds the base layer to the protection member; and
a second bonding layer which is stacked on at least some of a second base surface opposite to the first base surface, and bonds the base layer to the foldable housing.

17. The display of claim 16, wherein the first bonding layer has a first thickness, and
wherein the second bonding layer has a second thickness that is greater than the first thickness.

18. The display of claim 16, wherein the display comprises a central area which functions as an active area, and an edge area which extends to the edge of the display from the central area, and
wherein the cover member is connected to the edge area of the display.

19. The display of claim 16, wherein the protection member comprises:
a first protection area overlapping an active area of the display, and
a second protection area spaced apart from the first protection area at a predetermined distance, and which extends to the edge of the protection member, and
wherein a print layer is disposed on a surface of the second protection area.

20. An electronic device comprising:
a display including a first area and a second area;
a foldable housing comprising:
a first housing which supports the first area,
a second housing which supports the second area, and
a side surface member which encloses a space between a front surface on which the display is visually exposed to an outside of the electronic device, and a rear surface opposite to the front surface;
a hinge structure which connects the first housing and the second housing to be foldable relative to each other on a folding axis between a first state in which the first area and the second area are substantially coplanar, and a second state in which the first area and the second area face each other;
a protection member which covers a surface of the display; and
a cover member which covers an edge of the display to the side surface member of the display along a circumference of the display,
wherein a surface of the cover member which faces the front surface of the foldable housing is covered by the protection member, and wherein from a perspective facing the front surface of the foldable housing, a portion of the cover member which is connected to the display is disposed between the display and the protection member.

* * * * *